United States Patent
Jeong et al.

(10) Patent No.: US 10,866,357 B1
(45) Date of Patent: Dec. 15, 2020

(54) DISPLAY DEVICE

(71) Applicant: Samsung Display Co., Ltd., Yongin-Si (KR)

(72) Inventors: Hyeon Seon Jeong, Asan-si (KR); Young Gyu Jung, Seongnam-si (KR); Man Soo Kim, Asan-si (KR); Jun Hee Son, Asan-si (KR); Jung Gil Oh, Hwaseong-si (KR); Kwang Sun You, Cheonan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/846,459

(22) Filed: Apr. 13, 2020

(30) Foreign Application Priority Data

Jul. 10, 2019 (KR) .................. 10-2019-0083240

(51) Int. Cl.
*F21V 8/00* (2006.01)
*G02F 1/1333* (2006.01)
*G02F 1/133* (2006.01)
*G09G 3/36* (2006.01)

(52) U.S. Cl.
CPC ........... *G02B 6/0088* (2013.01); *G02B 6/005* (2013.01); *G02F 1/133308* (2013.01); *G02B 6/0065* (2013.01); *G02F 1/13306* (2013.01); *G02F 2001/133317* (2013.01); *G09G 3/36* (2013.01)

(58) Field of Classification Search
CPC .... G02B 6/005; G02B 6/0065; G02B 6/0088; F21F 1/133308
See application file for complete search history.

(56) References Cited

U.S. PATENT DOCUMENTS

2018/0157092 A1* 6/2018 Jung ................ B32B 17/10036

FOREIGN PATENT DOCUMENTS

| KR | 10-2012-0045940 A | 5/2012 |
| KR | 10-2012-0136879 A | 12/2012 |
| KR | 10-2018-0016684 A | 2/2018 |
| KR | 10-2018-0099956 A | 9/2018 |

* cited by examiner

*Primary Examiner* — Thomas M Sember
(74) *Attorney, Agent, or Firm* — Innovation Counsel LLP

(57) ABSTRACT

A display device and a backlight unit are provided. A display device including a first side on which a light source is disposed to face the first side, the display device includes an optical member including a light guide plate, a light source assembly disposed adjacent to the first side of the optical member, a lower accommodation container accommodating the light source assembly and the optical member, a backlight unit disposed on the lower accommodation container and including a middle accommodation container including a central opening; and a display panel disposed on the backlight unit and the middle accommodation container, wherein the middle accommodation container includes a middle chassis located at the first side, and a middle mold fastened to the middle chassis and disposed along at least one side of the display device other than the first side, and the middle chassis is formed of a material having a greater heat conductivity than the middle mold.

20 Claims, 16 Drawing Sheets

BLU : 200, 300, 400, 500, 600, 700

DISPLAY DEVICE

This application claims priority to Korean Patent Application No. 10-2019-0083240, filed on Jul. 10, 2019, and all the benefits accruing therefrom under 35 U.S.C. § 119, the disclosure of which is incorporated herein by reference in its entirety.

BACKGROUND

1. Field of the Disclosure

The present disclosure relates to a display device.

2. Description of the Related Art

In a non-light emitting type display device such as a liquid crystal display device, a display panel that generates an image does not emit light by itself, and generates an image using light provided from a backlight unit. The backlight unit includes a light source and a light guide plate configured to guide light emitted from the light source to a light emission surface.

Recently, in addition to technical research and development of a liquid crystal display device, necessity of research and development of a design of a product to appeal to consumers more is particularly emerging. Accordingly, an effort to reduce a thickness of the liquid crystal display device and decrease a bezel width of the liquid crystal display device has proceeded.

SUMMARY

The present disclosure is directed to providing a display device capable of efficiently dissipating heat emitted from a light source to prevent deformation of a middle mold.

The present disclosure is directed to providing a display device of which a thickness and a bezel width are reduced.

Problems in the present disclosure are not limited to the above-described problems, and other technical problems which are not mentioned may be apparently understood by those skilled in the art from the specification and the accompanying drawings.

An embodiment of a display device including a first side on which a light source is disposed to face the first side a, the display device includes an optical member including a light guide plate, an optical member including a light guide plate, a light source assembly disposed adjacent to the first side of the optical member, a lower accommodation container accommodating the light source assembly and the optical member, a backlight unit disposed on the lower accommodation container and including a middle accommodation container including a central opening and a display panel disposed on the backlight unit and the middle accommodation container, wherein the middle accommodation container includes a middle chassis located at the first side, and a middle mold fastened to the middle chassis and disposed along at least one side of the display device other than the first side, and the middle chassis is formed of a material having a greater heat conductivity than the middle mold.

An embodiment of a backlight unit includes an optical member including a light guide plate, the light guide plate including a first side, a light source assembly disposed to face the first side of the optical member, a lower accommodation container configured to accommodate the light source assembly and the optical member; and a middle accommodation container disposed on the lower accommodation container and including a central opening, wherein the middle accommodation container includes a middle chassis located at the first side, and a middle mold fastened to the middle chassis and disposed along at least one side of the light guide plate other than the first side, and the middle chassis is formed of a material having a greater heat conductivity than the middle mold.

According to one embodiment of the present disclosure, a display device capable of efficiently dissipating heat emitted from a light source to prevent deformation of a middle mold can be provided.

Further, according to the embodiment of the present disclosure, a display device of which a thickness and a bezel width are reduced can be provided.

Effects according to embodiments are not limited by the above, and more various effects are included in the specification.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification. In the attached figures, the thickness of layers and regions is exaggerated for clarity.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

Hereinafter, specific embodiments will be described with reference to the accompanying drawings.

Figure 1:
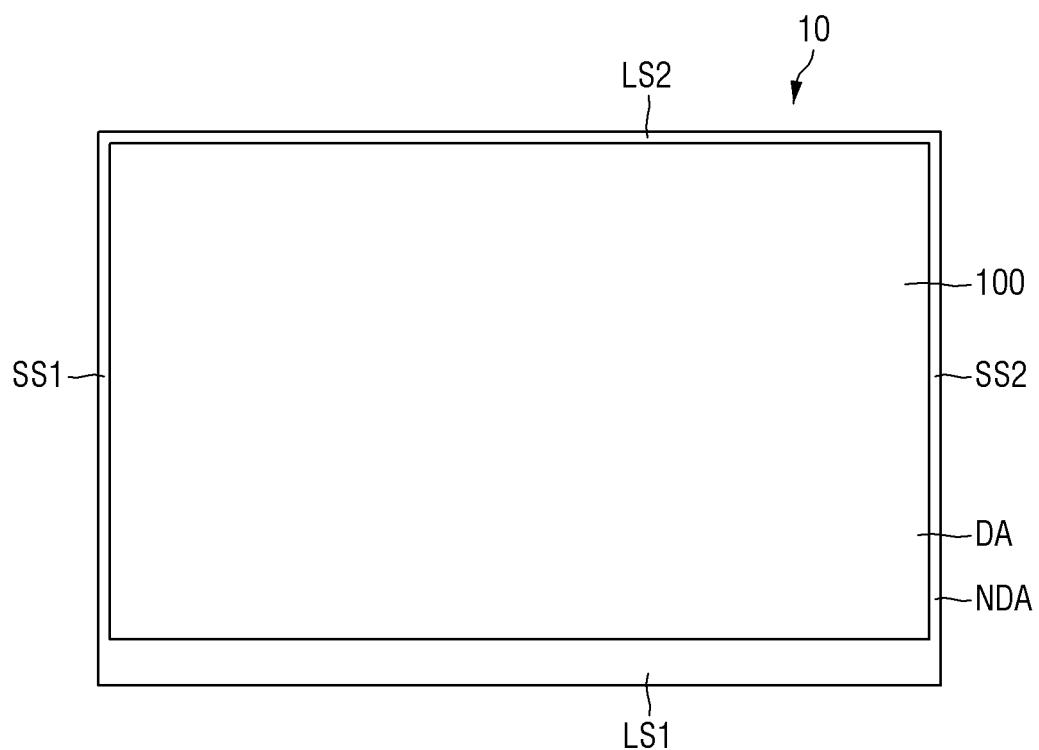
FIG. 1 is a plan view of a display device according to one embodiment.
Figure 1:
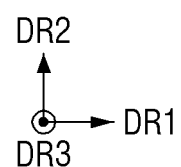

FIG. 1 is a plan view of a display device according to one embodiment.

Referring to FIG. 1, a display device 10 according to one embodiment may be formed in a substantially rectangular shape in a plan view. The display device 10 may have a rectangular shape of which edges of the display device 10 are disposed vertical to each other in a plan view. However, the present disclosure is not limited to the above, and the display device 10 may have a rectangular shape of which corners of the display device 10 are round in a plan view. The display device 10 may include four sides, wherein two sides of the four sides may be long sides, and the other two sides may be short sides.

In the drawing, a first direction DR1 refers to a lateral direction of the display device 10 in a plan view, and a second direction DR2 refers to a vertical direction of the display device 10 in a plan view. Further, a third direction DR3 refers to a thickness direction of the display device 10. The first direction DR1 and the second direction DR2 vertically cross, and the third direction DR3 vertically crosses both the first direction DR1 and the second direction in a direction crossing a plane on which the first direction DR1 and the second direction DR2 are laid. However, the directions mentioned in the embodiment should be understood as relative directions, and the embodiment is not limited to the mentioned direction.

Unless otherwise defined, an "upper portion", an "upper surface", and an "upper side" shown with respect to the third direction DR3 refer to a display surface with respect to a display panel 100, and a "lower portion", a "lower surface", and a "lower side" refer to an opposite side of the display surface with respect to the display panel 100

In the plan view of FIG. 1, a short side positioned on a left side of the display device 10 is referred to as a first short side SS1, a short side positioned on a right side is referred to as a second short side SS2, a long side positioned on a lower side is referred to as a first long side LS1, and a long side positioned on an upper side is referred to as a second long side LS2.

Referring to FIG. 1, the display device 10 may include a display area DA and a non-display area NDA. The display area DA is an area which displays an image or a video, and the non-display area NDA is an area located near the display area DA and in which the image or the video is not displayed. The non-display area NDA may be a bezel.

In the embodiment, the non-display area NDA may be disposed to surround all sides of the display area DA. In this case, as shown in FIG. 1, a width of the non-display area NDA of the first long side LS1 of the display device 10 may be greater than widths of the non-display area NDA of other sides SS1, SS2, and LS2. The widths of the non-display area NDA in the other sides SS1, SS2, and LS2 may be substantially the same but are not limited thereto. In another embodiment, the non-display area NDA may not practically exist on three sides SS1, SS2, and LS2 among the four sides LS1, LS2, SS1, and SS2 of the display device 10. In still another embodiment, the non-display area NDA may not practically exist on all four sides LS1, LS2, SS1, and SS2 in the display device 10 in the plan view.

In the embodiment, an upper surface at the first long side LS1 of the display device 10 may protrude in an upward direction more than upper surfaces at the other sides SS1, SS2, and LS2. That is, the bezel at the first long side LS1 may have a thickness greater than those at the other sides SS1, SS2, and LS2. The bezel at the first long side LS1 may be formed to protrude more than other bezels, and inner elements are covered to prevent exposure to the outside by the corresponding protruding structure. However, the present disclosure is not limited to the above, and the upper surface at the first long side LS1 may have a height identical to those at the other sides SS1, SS2, and LS2.

Figure 2:
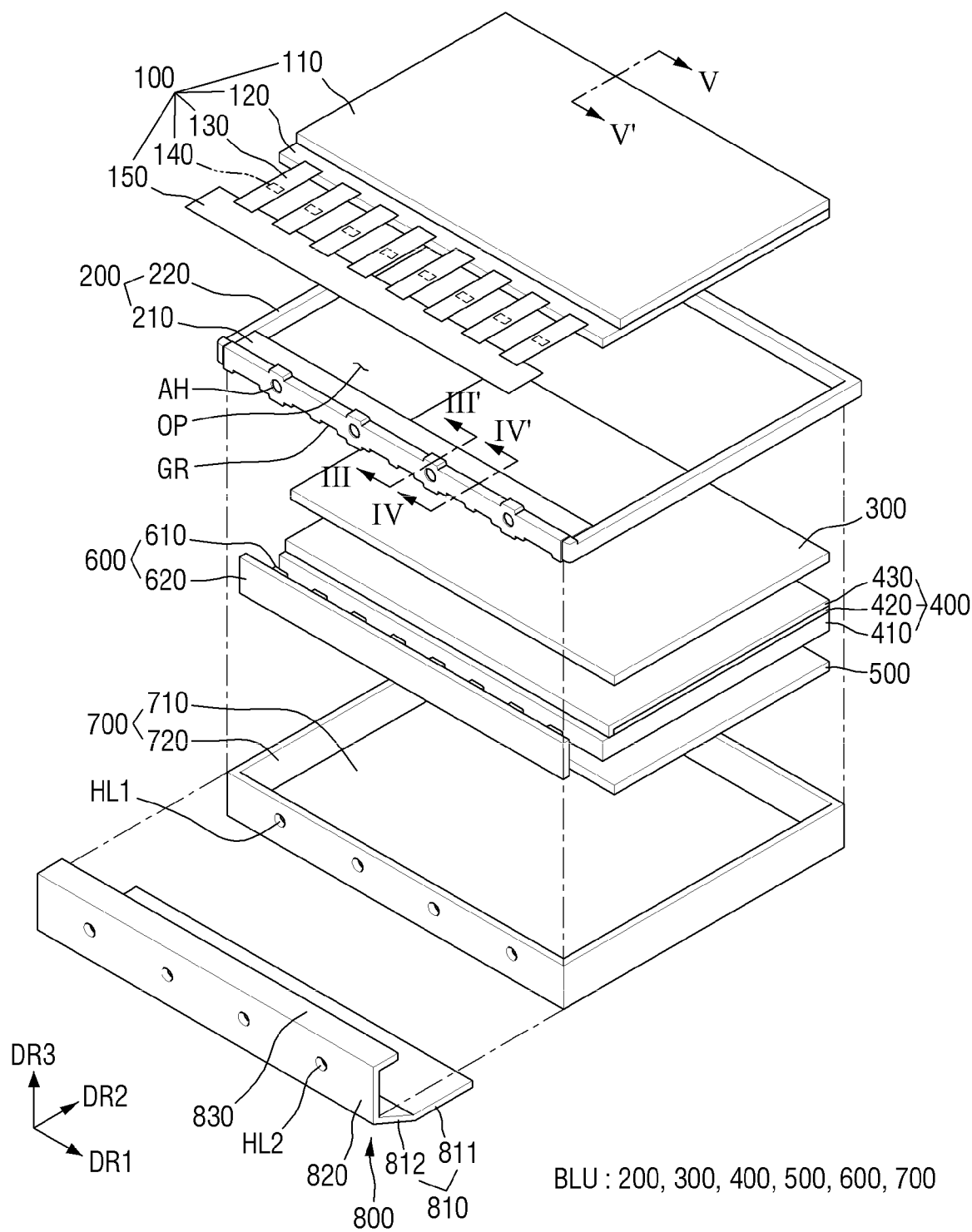
FIG. 2 is an exploded perspective view of the display device in FIG. 1.

FIG. 2 is an exploded perspective view of the display device in FIG. 1.

Referring to FIG. 2, the display device 10 may include the display panel 100 and a backlight unit BLU.

Although the display panel 100 may include various light receiving display panels such as a liquid crystal display panel, an electrowetting display panel, an electrophoretic display panel, a microelectromechanical system (MEMS) display panel, and the like, hereinafter, an example in which the display panel 100 is a liquid crystal display panel will be described.

The display panel 100 may receive light from the backlight unit BLU and may control transmittance of the received light by controlling liquid crystals to display an image. The display panel 100 may include a first substrate 120, a second substrate 110 facing the first substrate 120, and a liquid crystal layer (not shown) interposed between the first substrate 120 and the second substrate 110. The second substrate 110 may be a color filter substrate including a color filter. The first substrate 120 may be a thin film transistor substrate including a thin film transistor as a facing substrate. However, the present disclosure is not limited to the above, and the color filter may be formed on the first substrate 120. The first substrate 120 may include a protruding part configured to protrude outward from the second substrate 110. The protruding part of the first substrate 120 may provide a space in which an external device may be mounted.

The display panel 100 may further include a driving chip 140, at least one connection film 130, and a circuit board 150. One end of the connection film 130 may be connected to the protruding part of the first substrate 120, and the other end may be connected to the circuit board 150. The connection film 130 may be formed of a flexible material that can be bent.

When a plurality of connection films 130 (for example, eight connection films 130) are provided, the connection films 130 may be disposed to spaced apart from each other along an extending direction of the first long side LS1 of the display device 10.

The circuit board 150 may output signals to the first substrate 120 or receive signals from the first substrate 120 through the connection films 130. In FIG. 2, although the circuit board 150 is illustrated as being positioned on the same plane as the display panel 100 for convenience of description, the circuit board 150 may be disposed at various positions in actual applications. For example, because the connection films 130 are bent, the circuit board 150 may be disposed under the backlight unit BLU or on a side surface of the backlight unit BLU. In this case, the connection films 130 may be bent while partially or entirely surrounding the side surface of the backlight unit BLU at the first long side LS1.

The driving chip 140 receives external signals and generates driving signals for driving the display panel 100. The external signals are signals supplied from the circuit board 150 and may include image signals, various control signals, a driving voltage, and the like. The driving chip 140 may be mounted on the connection film 130. However, the present disclosure is not limited to the above, and the driving chip 140 may also be mounted on the circuit board 150 or the first substrate 120.

The backlight unit BLU may be disposed under the display panel 100. The backlight unit BLU may include a light source assembly 600, an optical member 400, an optical film 300, a reflection sheet 500, and the like and may include a lower accommodation container 700 (or a bottom chassis) and a middle accommodation container 200 as accommodation containers.

The light source assembly 600 may include a light source 610 and a printed circuit board 620. The light source assembly 600 may be disposed to face a side surface of the optical member 400 at the first long side LS1. The light source 610 may include a plurality of point light sources or linear light sources. The point light sources may be light emitting diode (LED) light sources. The plurality of light sources 610 may be mounted on the printed circuit board 620 and may receive a driving voltage from the printed circuit board 620.

The light source 610 according to the embodiment may be an LED. The light source 610 may emit light of a specific wavelength. For example, the light source 610 may emit light of a blue wavelength, a near ultraviolet wavelength, and/or an ultraviolet wavelength. In this case, the display device 10 may further include a wavelength conversion member configured to convert light of a specific wavelength like the above to white light. In the embodiment of FIG. 2, although an example in which the optical member 400 includes a wavelength conversion layer 420, the wavelength conversion member may be disposed in the light source assembly 600 and may also be disposed in the display panel 100. In another embodiment, the LED light source 610 may emit white light by itself.

The optical member 400 includes a light guide plate 410. The light guide plate 410 serves to receive light from the light source 610 and guide the received light to a light path.

The light guide plate 410 may have a substantially polygonal pillar shape. A planar shape of the light guide plate 410 may be a rectangular shape but is not limited thereto. For example, the light guide plate 410 may have a rectangular planar shape having four sides and may include an upper surface, a lower surface, and four side surfaces. A side surface of the light guide plate 410 at the first long side LS1 at which the light source assembly 600 is disposed adjacent thereto may be a light incident surface at which light is incident from the light source assembly 600.

In the embodiment, each of an upper surface and a lower surface of the light guide plate 410 is located in one plane, and the plane in which the upper surface is located and the plane in which the lower surface is located are substantially parallel and thus the light guide plate 410 may have a uniform thickness as a whole. However, the present disclosure is not limited to the above, and the upper surface or the lower surface may be formed of a plurality of planes, or the plane in which the upper surface is located and the plane in which the lower surface is located may intersect each other.

The light guide plate 410 may be formed of glass, quartz, polymer, or the like having transparency so that the light may be efficiently guided. In the embodiment in which the wavelength conversion layer 420 is integrally formed on the upper surface of the light guide plate 410, the light guide plate 410 may be formed of glass.

A scattering pattern (not shown) may be disposed in the lower surface of the light guide plate 410. The scattering pattern serves to change a traveling angle of light which undergoes a total internal reflection in the light guide plate 410 to emit the light to the outside of the light guide plate 410.

The optical member 400 may further include the wavelength conversion layer 420 disposed on the upper surface of the light guide plate 410 and a passivation layer 430 configured to cover the wavelength conversion layer 420.

The wavelength conversion layer 420 is disposed on the upper surface of the light guide plate 410. The wavelength conversion layer 420 may be formed to be integrated with the upper surface of the light guide plate 410. The wavelength conversion layer 420 may be, for example, formed directly on the upper surface of the light guide plate 410 or formed on the upper surface of the light guide plate 410 with a low refractive layer, a barrier layer, and/or the like interposed therebetween.

The wavelength conversion layer 420 at least partially converts a wavelength of incident light. When the LED light source 610 emits light of a specific wavelength, for example, a blue wavelength, the light guide plate 410 guides a path of the light of the specific wavelength to emit the light to the upper surface or the lower surface of the light guide plate 410. The wavelength conversion layer 420 disposed on the light guide plate 410 may convert some of the light of the blue wavelength incident from the light guide plate 410 to light of another wavelength, for example, light of a green wavelength or a red wavelength, to emit white light.

Specifically, the wavelength conversion layer 420 may include a binder layer and wavelength conversion particles dispersed in the binder layer. The wavelength conversion layer 420 may further include scattering particles dispersed in the binder layer in addition to wavelength conversion particles. The wavelength conversion particle is a particle which converts the wavelength of the incident light. The wave length conversion particle may be, for example, a quantum dot (QD), a fluorescent material, or a phosphorescent material. The wavelength conversion particle may include a plurality of wavelength conversion particles which convert the incident light to different wavelengths.

The wavelength conversion particle may include a first wavelength conversion particle which converts incident light of a specific wavelength to a first wavelength and emits the converted incident light and a second wavelength conversion particle which converts incident light of a specific wavelength to a second wavelength and emits the converted incident light. In the embodiment, light emitted from the light source 610 and incident on the wavelength conversion particle may be the light of a blue wavelength, the first wavelength may a green wavelength, and the second wavelength may be a red wavelength. Accordingly, some of the blue light incident on the wavelength conversion layer 420 may be incident on the first wavelength conversion particle and converted to the green wavelength to be emitted while passing through the wavelength conversion layer 420, some of the blue light may be incident on the second wavelength conversion particle and converted to the red wavelength to be emitted while passing through the wavelength conversion layer 420, and the remaining light may be directly emitted without being incident on the first and second wavelength conversion particles. Accordingly, the light which passes through the wavelength conversion layer 420 may be the white light which includes all the light of the blue wavelength, the light of the green wavelength, and the light of the red wavelength.

The passivation layer 430 may be disposed on the wavelength conversion layer 420. The passivation layer 430 serves to prevent permeation of impurities such as moisture or oxygen into the wavelength conversion layer 420. The passivation layer 430 may be formed to include inorganic materials. The passivation layer 430 may entirely overlap the wavelength conversion layer 420, cover the upper surface of the wavelength conversion layer 420, and further extend from the upper surface of the wavelength conversion layer 420 to an outer side to cover side surfaces of the wavelength conversion layer 420. The passivation layer 430 may come into contact with the upper surface and the side surfaces of the wavelength conversion layer 420. The passivation layer 430 may extend to an upper surface of an edge of the light guide plate 410 exposed by the wavelength conversion layer 420, and thus some of an edge portion of the passivation layer 430 may directly come into contact with the upper surface of light guide plate 410. The wavelength conversion layer 420 may be sealed by the passivation layer 430 or the like, and thus deterioration of the wavelength conversion layer 420 may be prevented. In the embodiment, the side surfaces of the wavelength conversion layer 420 may be partially exposed without being covered by the passivation layer 430.

At least one optical film 300 may be disposed on the passivation layer 430. The optical film 300 may be disposed to come into direct contact with the passivation layer 430 or to be spaced apart from the passivation layer 430.

The optical film 300 may be a prism film, a diffusion film, a micro lens film, a lenticular film, a polarizing film, a reflection polarizing film, a retardation film, or the like. The display device 10 may include a plurality of optical films 300 of the same type or different types. When the plurality of optical films 300 are applied, the optical films 300 may be disposed to overlap each other. A composite film in which two or more optical function layers are integrated may be used as the optical film 300.

The reflection sheet 500 may be disposed under the optical member 400. The reflection sheet 500 may be disposed under the light guide plate 410 to guide light which leaks to the lower surface of the light guide plate 410 to the light guide plate 410 again. The reflection sheet 500 may be formed of a reflective metal, a plastic material having high reflexibility, or the like.

The lower accommodation container 700 serves to accommodate the optical film 300, the optical member 400, the light source assembly 600, the reflection sheet 500, and the like. To this end, the lower accommodation container 700 may include an accommodation space capable of accommodating the above-described members therein. The lower accommodation container 700 may include a bottom surface 710 and a sidewall portion 720 bent and extended upward from edges of the bottom surface 710 along the periphery of the bottom surface 710. The reflection sheet 500, the optical member 400, and the optical film 300 may be sequentially stacked on the bottom surface 710 of the lower accommodation container 700 in an inner space of the sidewall portion 720 of the lower accommodation container 700. The light source assembly 600 may be disposed adjacent to an inner side surface of the sidewall portion 720 of the lower accommodation container 700 to face the side surface of the optical member 400 at the first long side LS1.

First holes HL1 for alignment with alignment holes AH of a middle chassis 210 may be disposed in the sidewall portion 720 of the lower accommodation container 700 located at the first long side LS1. A detailed description thereof will be described later.

The middle accommodation container 200 may be disposed on the optical film 300 and the optical member 400. The middle accommodation container 200 may have a square-frame shape in a plan view. The middle accommodation container 200 may include a sidewall configured to extend downward from an edge thereof.

The middle accommodation container 200 may include a hole OP (or an opening) in a center thereof. The hole OP may have a substantially rectangular planar shape. The middle accommodation container 200 may have a uniform width at the first short side SS1, the second long side LS2, and the second short side SS2, but the first long side LS1 may have a width greater than the other sides SS1, SS2, and LS2. The middle accommodation container 200 may cover the light source assembly 600 on the first long side LS1.

A size of the hole OP may be smaller than a size of the optical film 300 of the backlight unit BLU. The edge of the optical film 300 may be located between the middle accommodation container 200 and the light guide plate 410. Accordingly, the optical film 300 may be fixed in a thickness direction by the middle accommodation container 200 and the light guide plate 410 but is not limited thereto.

The middle accommodation container 200 may include the middle chassis 210 and a middle mold 220. The middle chassis 210 and the middle mold 220 may be fastened to each other to form the square-frame shaped middle accommodation container 130. The middle chassis 210 may have a shape corresponding to one of the four sides, for example, LS1. The middle mold 220 may have a shape corresponding to the remaining three sides, for example, LS2, SS1, and SS2.

The middle chassis 210 and the middle mold 220 may be formed of different materials. The middle chassis 210 may be formed of a material having a heat conductivity greater than that of the middle mold 220. For example, the middle chassis 210 may be formed of a metal material, and the middle mold 220 may be formed of a plastic material such as polycarbonate or the like. A detailed description of the middle chassis 210 and the middle mold 220 will be described later.

The display device 10 may further include a shield case 800 configured to protect the connection film 130 and the circuit board 150. The shield case 800 may have a substantially "L" shape in a cross-sectional view. The shield case 800 may be disposed to cover the side surface of the middle accommodation container 200 at the first long side LS1 and a lower surface of the lower accommodation container 700 at the first long side LS1 of the display device 10. The shield case 800 may surround the connection film 130 and the circuit board 150 at an outer side and may prevent exposure of the connection film 130 and the circuit board 150 to the outside. The shield case 800 may have a predetermined rigidity and may prevent damage of the connection film 130 and the circuit board 150 due to an external force. Further, the shield case 800 may include a conductive layer to protect the connection film 130 and the circuit board 150 from static electricity or the like.

The shield case 800 may include a main body portion 810, a side portion 820, and an upper surface cover portion 830. The main body portion 810 may be disposed under the lower accommodation container 700 or the circuit board 150, and the side portion 820 may be disposed adjacent to the side surface of the middle accommodation container 200 at the first long side LS1. The side portion 820 may extend from one side of the main body portion 810 in an upward direction along the side surface of the middle accommodation container 200 at the first long side LS1. An inner side surface of the side portion 820 of the shield case 800 may face an outer side surface of the middle chassis 210. Second holes HL2 which may be aligned with the alignment holes AH of the middle chassis 210 may be disposed in the side portion 820 of the shield case 800. A detailed description thereof will be described later.

The main body portion 810 may include a lower end portion 811 and an inclined portion 812. The lower end portion 811 of the shield case 800 may have a plate shape which is substantially parallel to the display panel 100. The inclined portion 812 may be formed to extend from one side of the lower end portion 811 of the shield case 800 (for example, a side adjacent to the first long side LS1 of the display device 10) in a diagonal direction forming an obtuse angle with the lower end portion 811.

The upper surface cover portion 830 may be a portion bent and extended from an upper portion of the side portion 820 in an extending direction of the main body portion 810, that is, in the second direction DR2. An extending length of the upper surface cover portion 830 in the second direction DR2 may be smaller than an extending length of the main body portion 810 in the second direction DR2. In some embodiments, the shield case 800 may not include the upper surface cover portion 830.

Figure 3:
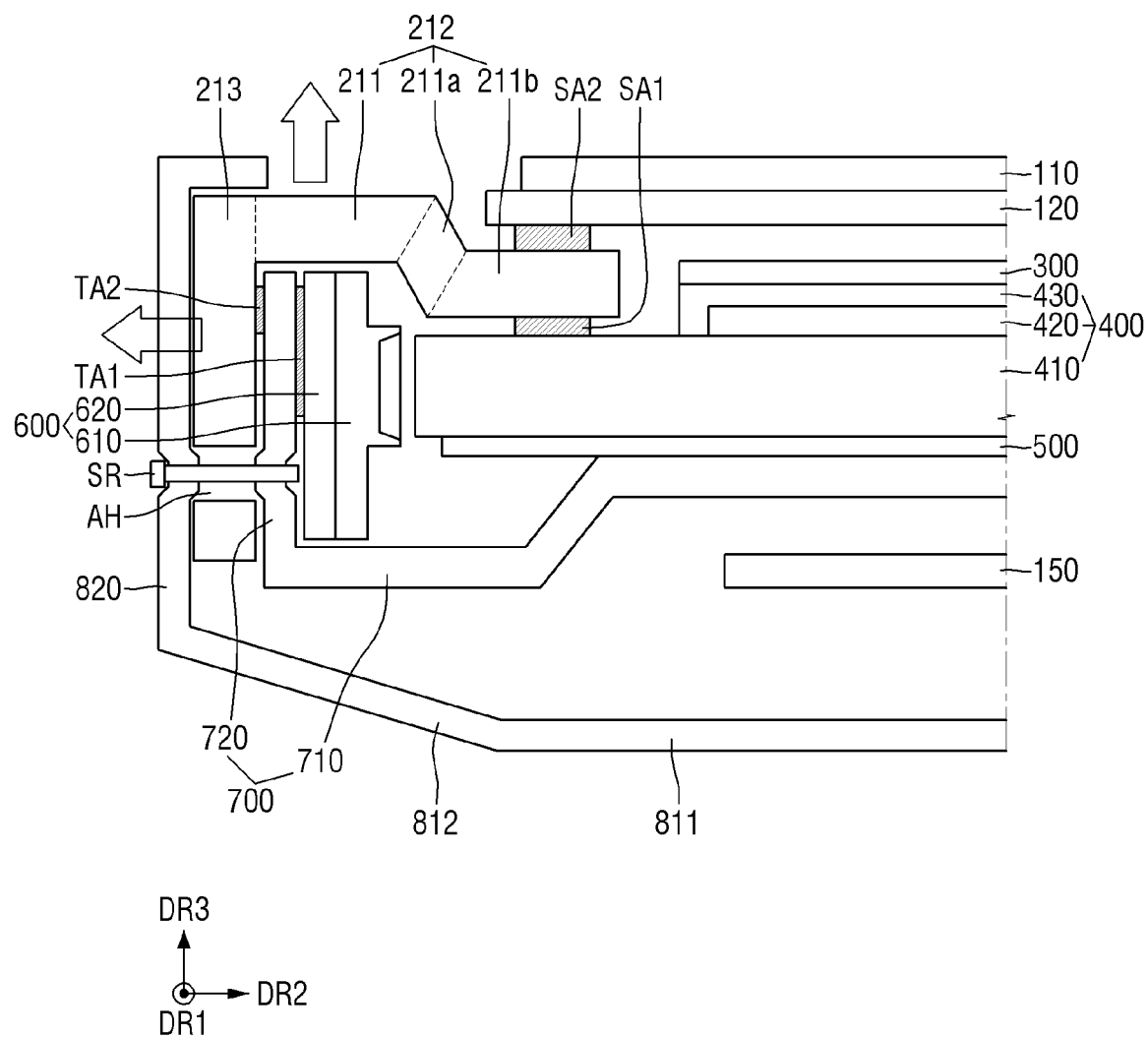
FIG. 3 is a cross-sectional view taken along line III-III' in FIG. 2.
Figure 4:
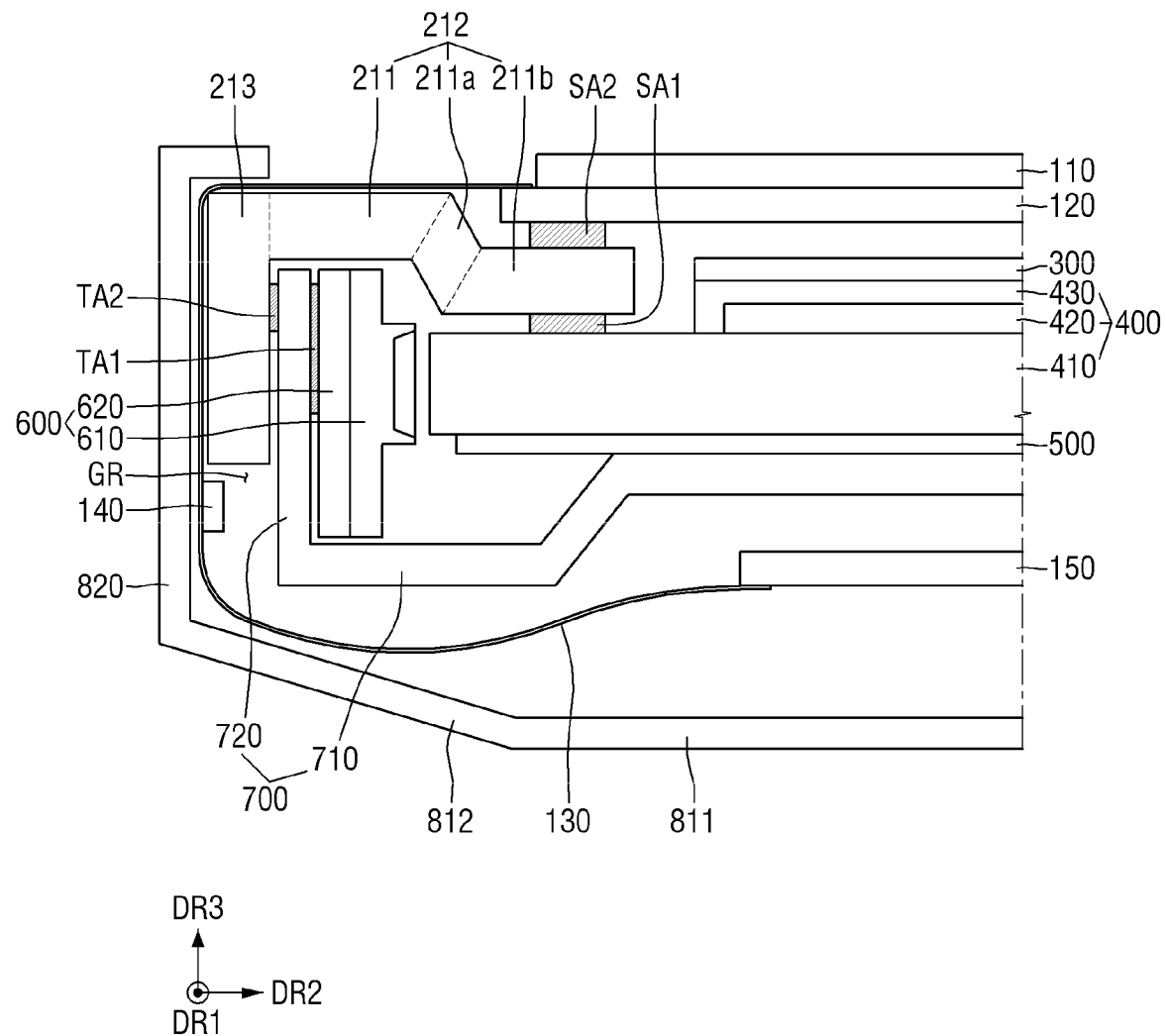
FIG. 4 is a cross-sectional view taken along line IV-IV' in FIG. 2.
Figure 5:
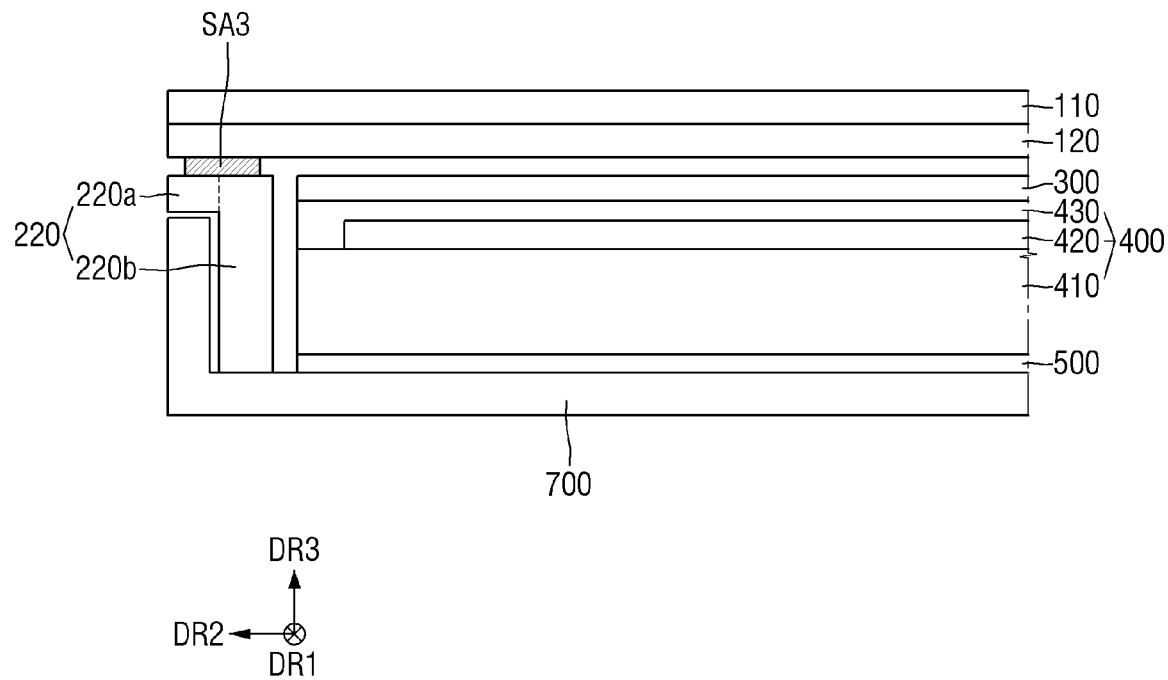
FIG. 5 is a cross-sectional view taken along line V-V' in FIG. 2.

FIG. 3 is a cross-sectional view taken along line III-III' in FIG. 2, FIG. 4 is a cross-sectional view taken along line IV-IV' in FIG. 2, and FIG. 5 is a cross-sectional view taken along line V-V' in FIG. 2. A coupling of the display device will be described in detail with reference to FIGS. 3 to 5.

The middle chassis 210 may include a chassis side surface portion 213 and an upper cover portion 212. The chassis side surface portion 213 may extend from an outer side of the sidewall portion 720 of the lower accommodation container 700 along the sidewall portion 720 in the third direction DR3. The chassis side surface portion 213 may be disposed between the sidewall portion 720 of the lower accommodation container 700 and the side portion 820 of the shield case 800. The upper cover portion 212 may include a first upper surface portion 211, a second upper surface portion 211b, and a step portion 211a and may extend inward from an upper end of the chassis side surface portion 213 toward a center of the display panel 100. The first upper surface portion 211 may be connected to the chassis side surface portion 213, and the second upper surface portion 211b may be connected to the first upper surface portion 211 through the step portion 211a and may have a height different from that of the first upper surface portion 211. The step portion 211a may connect the first upper surface portion 211 and the second upper surface portion 211b. The first upper surface portion 211 may cover an upper surface of the sidewall portion 720 of the lower accommodation container 700 at the first long side LS1 and an upper surface of the light source assembly 600, and the second upper surface portion 211b may cover a portion of the light guide plate 410 exposed by the optical film 300. A portion at the first long side LS1 of the lower accommodation container 700 disposed at the first long side LS1 of the display device 10 and portions of the light source assembly 600 and the light guide plate 410 at the first long side LS1 may not be viewed from the outside due to the first upper surface portion 211 and the second upper surface portion 211b. The first upper surface portion 211 of the middle chassis 210 may overlap side surfaces of the light source assembly 600 and the lower accommodation container 700 at the first long side LS1 in a thickness direction, and the second upper surface portion 211b may overlap the display panel and the light guide plate 410 in a thickness direction.

An inner side surface of the second upper surface portion 211b of the middle chassis 210 may be located adjacent to a side surface of the passivation layer 430 to expose the light guide plate 410 and may be located to be spaced apart from the side surface of the passivation layer 430 in the second direction DR2 at a predetermined interval.

The upper surface of the light guide plate 410 exposed by the wavelength conversion layer 420 or the passivation layer 430 may be an area disposed adjacent to the first long side LS1 in the upper surface of the light guide plate 410, and the second upper surface portion 211b of the middle chassis 210 may be located on the upper surface of the light guide plate 410. The display panel 100 may be disposed on the second upper surface portion 211b of the middle chassis 210. A first support member SA1 and a second support member SA2 may be disposed between the exposed upper surface of the light guide plate 410 and the second upper surface portion 211b of the middle chassis 210 and between the second upper surface portion 211b of the middle chassis 210 and the display panel 100, respectively. The support members SA1 and the SA2 may prevent or relieve a shock or the like from transmitting between the light guide plate 410 and the middle chassis 210 or between the middle chassis 210 and the display panel 100.

The light source assembly 600 is disposed on an inner side surface of the sidewall portion 720 of the lower accommodation container 700 at the first long side LS1. An opposite surface of the printed circuit board 620 on which the light source 610 is disposed and the inner side surface of the sidewall portion 720 of the lower accommodation container 700 at the first long side LS1 may be combined with each other. A first bonding member TA1 may be disposed between the opposite surface of the printed circuit board 620 on which the light source 610 is disposed and the inner side surface of the sidewall portion 720 of the lower accommodation container 700 at the first long side LS1. The first bonding member TA1 may be, for example, a double-sided adhesion tape. The first bonding member TA1 is attached to at least a portion of each of the opposite surface of the printed circuit board 620 on which the light source assembly 600 is disposed and the inner side surface of the sidewall portion 720 of the lower accommodation container 700 at the first long side LS1, and thus couples the at least portion of each of the opposite surface of the printed circuit board 620 on which the light source assembly 600 is disposed and the inner side surface of the sidewall portion 720 of the lower accommodation container 700 at the first long side LS1. Accordingly, the light source assembly 600 and the lower accommodation container 700 may be coupled to each other by the first bonding member TA1. However, a method of coupling the light source assembly 600 and the lower accommodation container 700 may not limited to the above. For example, the light source assembly 600 and the lower accommodation container 700 may be hook-coupled to each other at an edge portion and may be coupled to each other by other units.

The chassis side surface portion 213 of the middle chassis 210 may be disposed on an outer side surface of the sidewall portion 720 of the lower accommodation container 700 coupled to the light source assembly 600 at the first long side LS1. A second bonding member TA2 may be disposed between the outer side surface of the sidewall portion 720 of the lower accommodation container 700 at the first long side LS1 and an inner side surface of the chassis side surface portion 213 of the middle chassis 210. The second bonding member TA2 may be, for example, a double-sided adhesion tape. The second bonding member TA2 may be attached to each of the outer side surface of the sidewall portion 720 of the lower accommodation container 700 at the first long side LS1 and the inner side surface of the chassis side surface portion 213 of the middle chassis 210, and the lower accommodation container 700 and the middle chassis 210 may be coupled to each other by the second bonding member TA2. However, the present disclosure is not limited to the above, and a bonding member may not be disposed between the lower accommodation container 700 and the middle chassis 210, and in this case, the lower accommodation container 700 and the middle chassis 210 may be coupled to each other by a fastener SR to be described later. Further, the lower accommodation container 700 and the middle chassis 210 may be coupled to each other using hook-coupling, a screw, or the like.

The side portion 820 of the shield case 800 may be located at an outer side of the chassis side surface portion 213 of the middle chassis 210. When the shield case 800 includes the upper surface cover portion 830, the upper surface cover portion 830 may be located on the first upper surface portion 211 of the middle chassis 210 to partially cover the first upper surface portion 211.

As shown in FIG. 3, the first holes HL1 may be located in the sidewall portion 720 of the lower accommodation container 700 at the first long side LS1, the alignment holes AH may be located in the chassis side surface portion 213 of the middle chassis 210, and the second holes HL2 may be located in the side portion 820 of the shield case 800. The first holes, the alignment holes AH, and the second holes HL2 may be aligned in the second direction DR2 and may be coupled to each other by the fastener SR (for example, a bolt). A detailed description thereof will be described later.

Referring to FIG. 4, the circuit board 150 and the driving chip 140 may be disposed in which the alignment holes AH, the first holes HL1, and the second holes HL2 are not disposed. Further, an extending length of the chassis side surface portion 213 of the middle chassis 210 in a thickness direction in which the circuit board 150 and the driving chip 140 is disposed may also be shorter than a length in the thickness direction of the chassis side surface portion 213 of the middle chassis 210 in which the alignment holes AH, the first holes HL1, and the second holes HL2 are disposed. In this case, the driving chip 140 disposed on the connection film 130 may be disposed under the chassis side surface portion 213 of the middle chassis 210 to be spaced apart from the chassis side surface portion 213 of the middle chassis 210. In other words, the driving chip 140 may be located under the chassis side surface portion 213 of the middle chassis 210 at the first long side LS1, may be located on the connection film 130, and may be located between the connection film 130 and the sidewall portion 720 of the lower accommodation container 700 at the first long side LS1. A detailed description thereof will be described later.

Referring to FIGS. 3 and 4, the light source 610 may emit heat as well as light and may be disposed to be spaced apart from the side surface of the light guide plate 410 at the first long side LS1. In this case, it is possible to prevent the light guide plate 410 from being damaged by heat generated from the light source 610. Further, as described above, the light source assembly 600 may come into contact with the sidewall portion 720 of the lower accommodation container 700 at the first long side LS1, and the sidewall portion 720 may come into contact with the chassis side surface portion 213 of the middle chassis 210. In this case, the heat emitted from the light source 610 may be transferred to the sidewall portion 213 of the middle chassis 210 through the sidewall portion 720 of the lower accommodation container 700 coupled to the light source assembly 600. As described above, because the middle chassis 210 may be formed of metal, and the metal has excellent heat conductivity, the heat may be easily transferred to an entire area of the middle chassis 210. Further, the heat transferred to the entire area of the middle chassis 210 may be radiated toward an upper portion of the middle chassis 210 through the first upper surface and the second upper surface of the middle chassis 210 and toward an outer side of a side surface of the display device 10 at the first long side LS1 through the chassis side surface portion 213. In this case, because the heat emitted from the light source 610 may be discharged to the outside of the display device 10, deformation and damage of neighboring elements due to the heat generated from the light source 610 may be prevented.

As shown in FIG. 5, the cross-sectional view of the second long side LS2 may include the middle mold 220 rather than the middle chassis 210 of the middle accommodation container 200. The middle mold 220 may include a mold upper surface portion 220a and a mold side surface portion 220b. The mold side surface portion 220b of the middle mold 220 may extend in the third direction DR3 along the sidewall portion 720 of the lower accommodation container 700. The mold upper surface portion 220a may extend to an outer side from an upper surface of the mold side surface portion 220b.

Referring to FIG. 5, the mold side surface portion 220b of the middle mold 220 may be disposed at an inner side of the sidewall portion 720 of the lower accommodation container 700. That is, the middle mold 220 in addition to the optical film 300, the optical member 400, and the reflection sheet 500 which are accommodated may be located in the lower accommodation container 700. The mold upper surface portion 220a may be located between the sidewall portion 720 of the lower accommodation container 700 and the first substrate 120. The first substrate 120 and the second substrate 110 may be disposed on the mold upper surface portion 220a, and a third support member SA3 may be disposed between the first substrate 120 and the middle mold 220. The third support member SA3 may prevent or relieve a shock or the like from transmitting between the middle mold 220 and the display panel 100. Further, the light guide plate 410 may not have an area exposed by the wavelength conversion layer 420 or the passivation layer 430.

In FIG. 5, ends of the first substrate 120 and the second substrate 110 in the second direction DR2 may be aligned in the thickness direction with an outer end portion of the mold upper surface portion 220a and the outer side surface of the sidewall portion 720 of the lower accommodation container 700. Accordingly, the non-display area NDA may not be substantially present at the second long side LS2 of the display device 10.

FIG. 5 shows a cross-sectional view at the second long side LS2 of the display device 10. However, because the middle mold 220 is located at the second long side LS2, the first short side SS1, and the second short side SS2 excluding the first long side LS1 at which the middle chassis 210 is located, cross-sectional views at the first short side SS1 and the second short side SS2 may be substantially the same as the cross-sectional view at the second long died LS2 as shown in FIG. 5. Accordingly, the non-display area NDA may not be substantially present at not only the second long side LS2 of the display device 10 but also the first short side SS1 and the second short side SS2.

Figure 6:
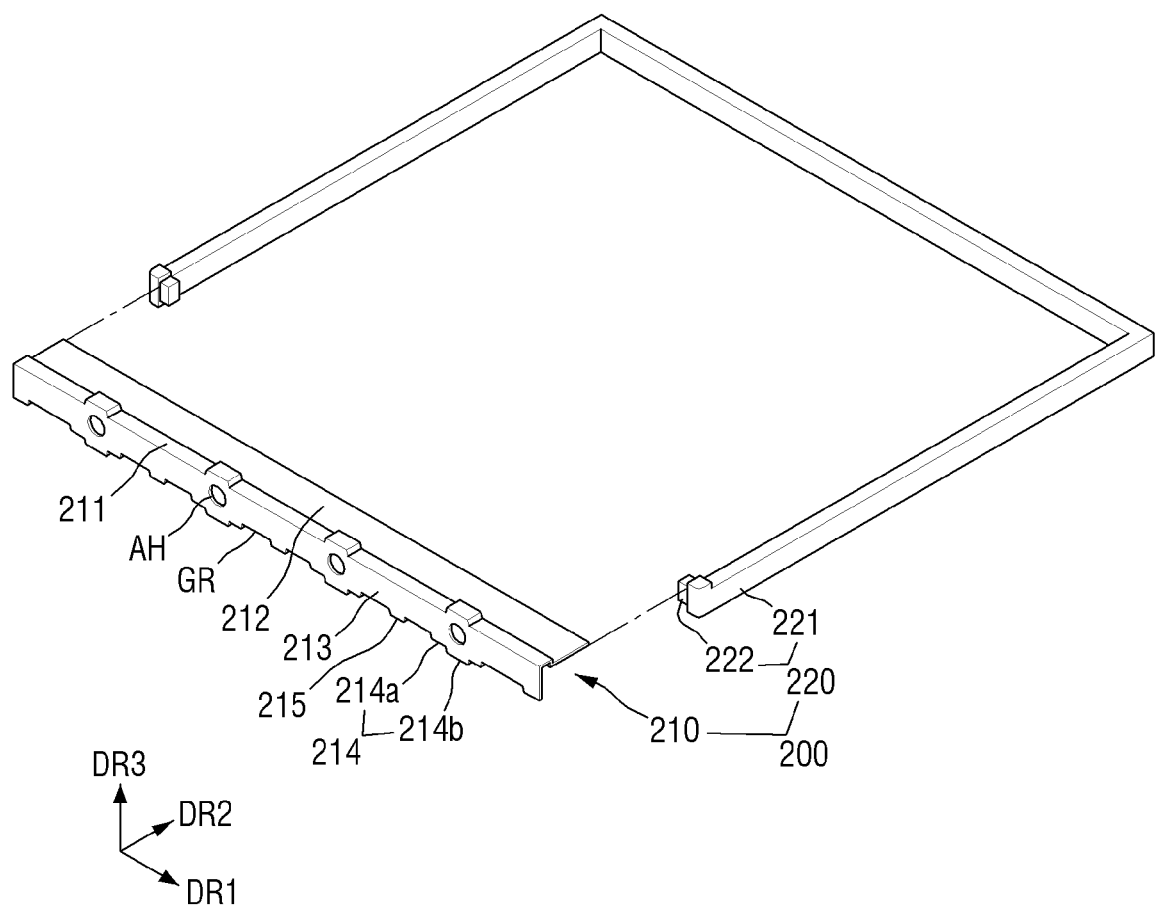
FIG. 6 is an exploded perspective view of a middle accommodation container according to the embodiment.
Figure 7:
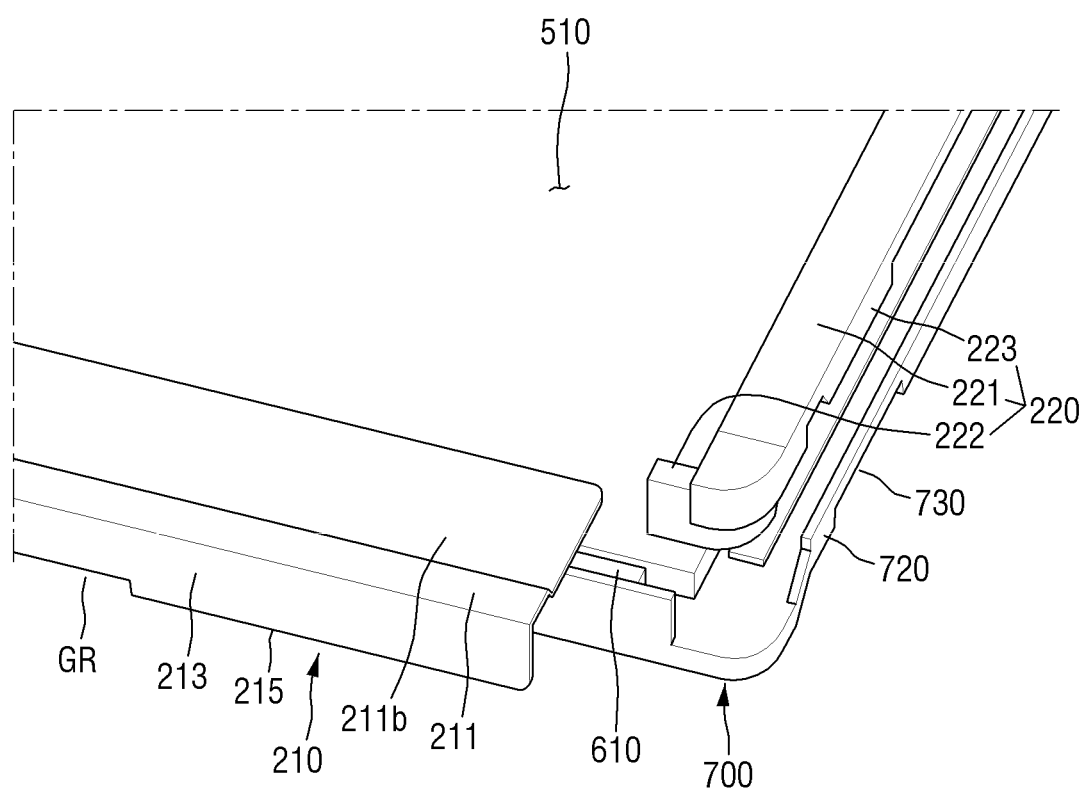
FIGS. 7 and 8 are views for describing a middle chassis and a middle mold according to the embodiment are coupled.
Figure 8:
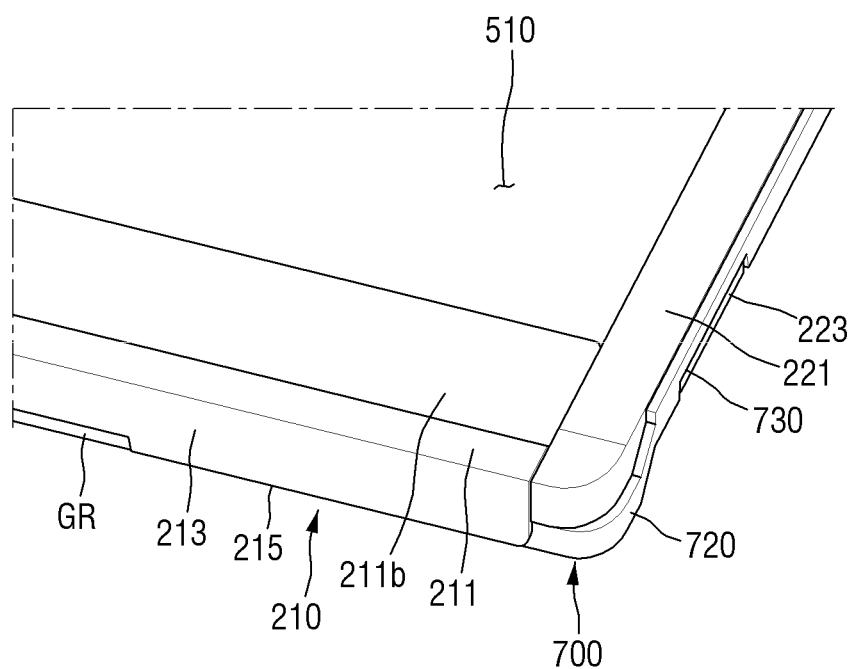

FIG. 6 is an exploded perspective view of the middle accommodation container 200 according to the embodiment. FIGS. 7 and 8 are views in which the middle chassis and the middle mold according to the embodiment are coupled. With reference to FIGS. 6 to 8, the middle chassis 210 and the middle mold 220 constituting the middle accommodation container 200 may be described in detail.

A body part 221 of the middle mold 220 may include the mold upper surface portion 220a and the mold side surface portion 220b. The middle mold 220 may further include a coupling portion 223 configured to protrude to an outer side from the body part 221 and an insertion part 222 configured to protrude to an inner side from the body part 221. The body part 221 may have a rounded end portion through which the middle chassis 210 is connected to the body part 221.

The coupling portion 223 of the middle mold 220 may be coupled to the coupling groove 730 located in the sidewall portion 720 of the lower accommodation container 700 to fix the middle mold 220 and the lower accommodation container 700. In this case, the coupling portion 223 may protrude toward an outer side of the display device 10 from the body part 221 of the middle mold 220 and may be inserted into the coupling groove 730 toward an outer side of the lower accommodation container 700 from an inner side of the lower accommodation container 700 to be coupled to the coupling groove 730 of the lower accommodation container 700 in a process of assembling the backlight unit BLU.

The insertion part 222 may protrude toward the middle chassis 210 from the body part 221, and an upper surface of the insertion part 222 may be recessed from an upper surface of the body part 221. The body part 221 of the middle mold 220 may be disposed on the lower accommodation container 700, but the insertion part 222 may be inserted into a space between the sidewall portion 720 of the lower accommodation container 700 and the light guide plate 410. The insertion part 222 inserted between the sidewall portion 720 of the lower accommodation container 700 and the light guide plate 410 may be located at a side surface of the light source 610 arranged in an extending direction of the light source 610 substrate.

As described above, the middle chassis 210 may include the first upper surface portion 211, the second upper surface portion 211b, and the chassis side surface portion 213. As shown in FIGS. 6 to 8, the alignment holes AH, a first protruding part 214, a second protruding part 215, and a lower end groove GR may be disposed in the chassis side surface portion 213 of the middle chassis 210. The alignment holes AH may be portions passing through the chassis side surface portion 213 of the middle chassis 210 in the second direction DR2. The middle chassis 210 according to the embodiment includes four alignment holes AH but the number of the alignment holes is not limited thereto. The alignment holes AH may align the middle chassis 210, the lower accommodation container 700, and the shield case 800. A detailed description thereof will be described later.

The first upper surface portion 211 under which the alignment holes AH are disposed may protruded from the first upper surface 211 in which the alignment holes AH are not disposed. The first protruding part 214 may be located in a lower portion of the chassis side surface portion 213 in which the alignment holes AH are disposed, and the first protruding part 214 may include first ends 214a and second ends 214b. The first protruding part 214 under the alignment holes AH may protrude further downward than other portions of the chassis side surface portion 213. The first protruding part 214 may include a double-step form which protrudes toward a lower portion of the chassis side surface portion 213. A portion corresponding to the alignment hole AH in the first protruding part 214 may be defined as the second end 214b, and a portion located at a side surface of the second end 214b in the first direction may be defined as the first end 214a. In this case, the second end 214b may protrude farthest in a downward direction from the chassis side surface portion 213 of the middle chassis 210, and the first end 214a may protrude from the chassis side surface portion 213 of the middle chassis 210 more than other portions of the chassis side surface portion 213 but may protrude in a downward direction less than the second end 214b.

In the chassis side surface portion 213 of the middle chassis 210, the second protruding parts 215 may be disposed between adjacent first protruding parts 214 and at both ends of the chassis side surface portion 213 in the first direction DR1. The second protruding part 215 may further protrude in a downward direction from the chassis side surface portion 213 of the middle chassis 210 like the first protruding part 214. Further, the second protruding part 215 may extend in an extending direction of the middle chassis 210 by a predetermined length and may have a substantially uniform width in the thickness direction. However, the second protruding parts 215 located at both ends of the middle chassis 210 may have a length extending in the first direction DR1 smaller than that of the second protruding part 215 located between the first protruding parts 214. Further, a length by which the second protruding part 215 protrudes in the downward direction may be smaller than a length by which the first end 214a of the first protruding part 214 protrudes in the downward direction.

Figure 9:
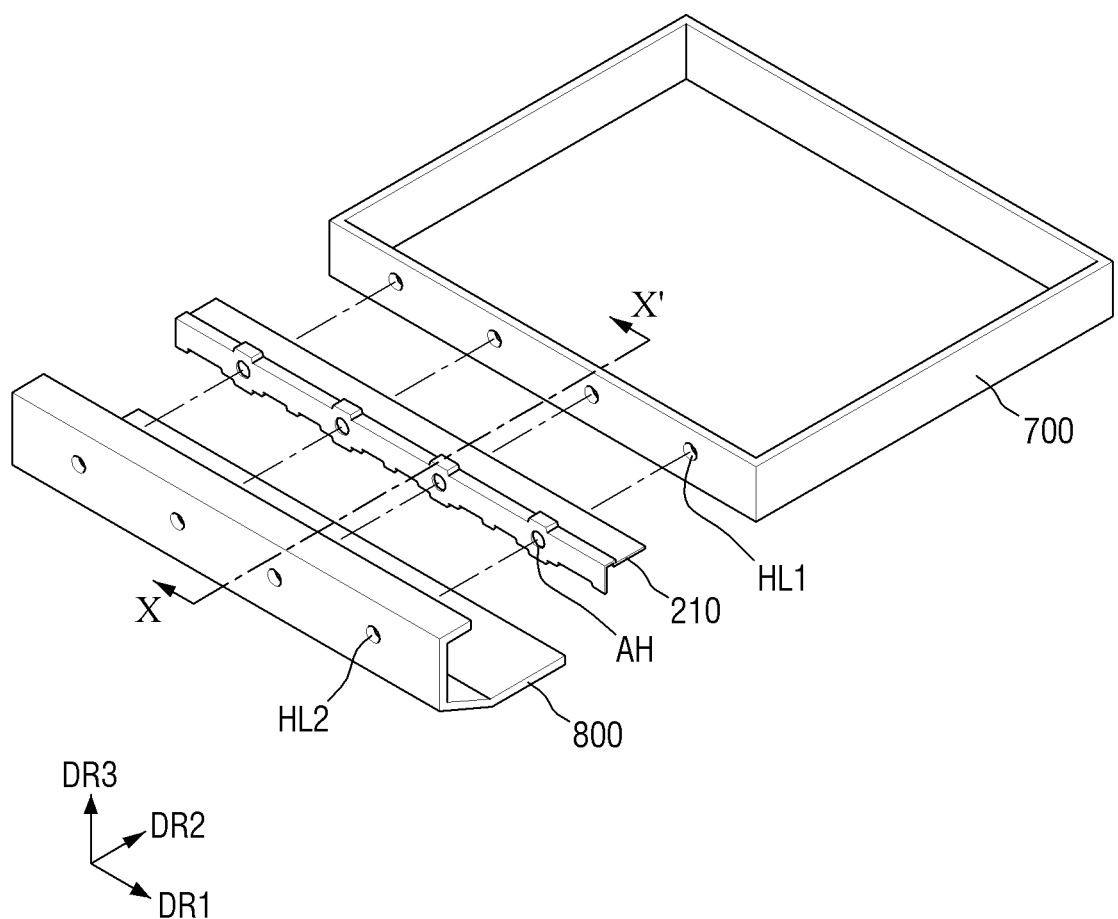
FIG. 9 is an exploded perspective view of a lower accommodation container, a middle chassis, and a shield case according to the embodiment.
Figure 10:
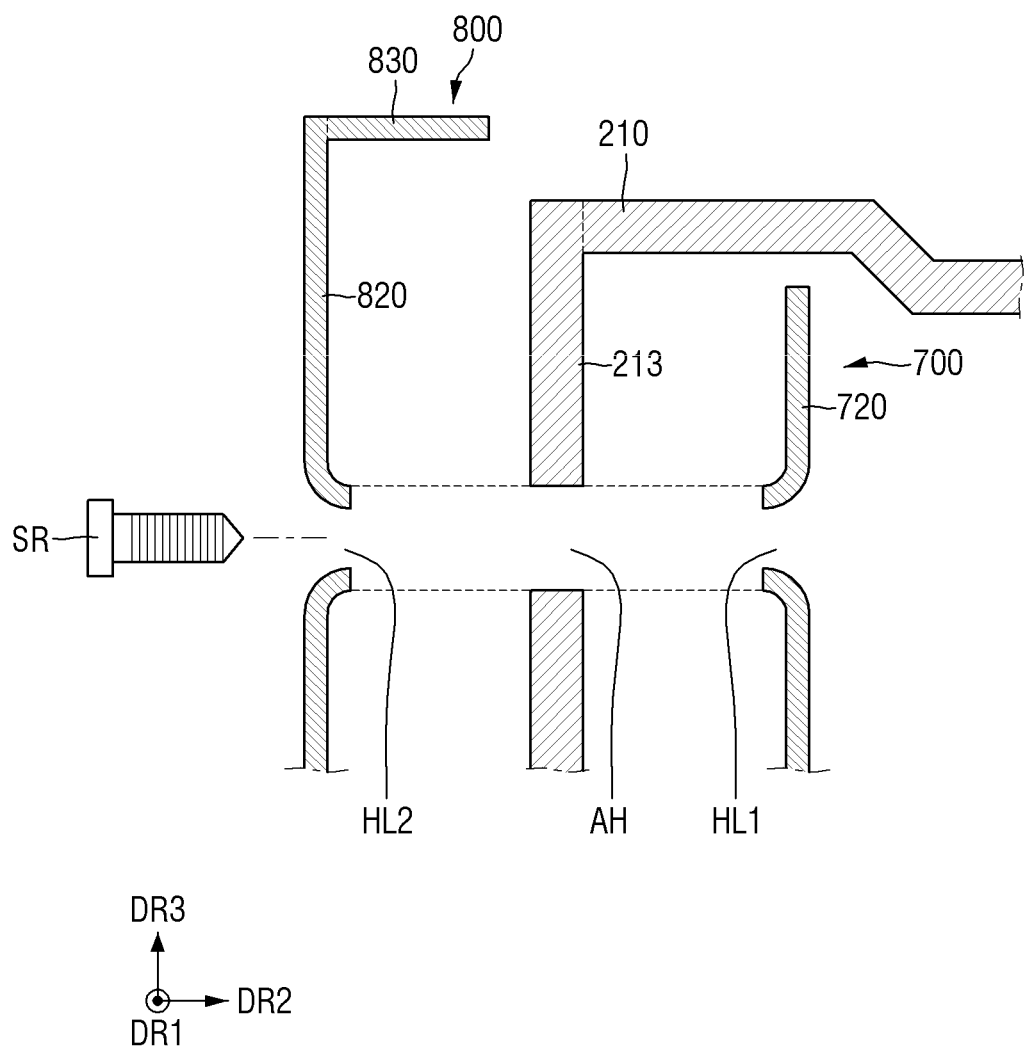
FIG. 10 is a cross-sectional view taken along line X-X' in FIG. 9.

In the chassis side surface portion 213 of the middle chassis 210, the lower end grooves GR recessed from the first protruding part 214 and the second protruding part 215 may be located between the first protruding part 214 and the second protruding part 215. Referring to FIG. 2 further, the number of lower end grooves GR may be the same as the number of connection films 130 or driving chips 140. In the lower end groove GR disposed between the first protruding part 214 and the second protruding part 215, the driving chip 140 disposed on the connection film 130 may be disposed to overlap the lower end groove FR in a plan view. A detailed description thereof will be described later FIG. 9 is an exploded perspective view of the lower accommodation container, the middle chassis, and the shield case according to the embodiment. FIG. 10 is a cross-sectional view taken along line X-X' in FIG. 9. FIGS. 9 and 10 are views for describing a method of aligning the middle chassis 210, the lower accommodation container 700, and the shield case 800. For the sake of description, only the middle chassis 210, the lower accommodation container 700, and the shield case 800 are shown. It will be described in detail that the middle chassis 210, the lower accommodation container 700, and the shield case 800 can be aligned with each other, with reference to FIGS. 9 and 10.

As described above, the alignment holes AH may be located in the chassis side surface portion 213 of the middle chassis 210, the first holes HL1 may be located in the sidewall portion 720 of the lower accommodation container 700 at the first long side LS1, and the second holes HL2 may be located in the side portion 820 of the shield case 800. The alignment holes AH, the first holes HL1, and the second holes HL2 may be aligned in the second direction DR2, and the alignment holes AH, the first holes HL1, and the second holes HL2 may overlap each other in the second direction DR2. In the display device 10 according to the embodiment, the number of alignment holes AH, the number of first holes HL1, and the number of second holes HL2 may be the same. However, the present disclosure is not limited to the above Like the alignment holes AH, the first holes HL1 and the second holes HL2 may be areas which physically pass through the sidewall portion 720 of the lower accommodation container 700 and the side portion 820 of the shield case 800. However, the first holes HL1 and the second holes HL2 do not only physically pass through the sidewall portion 720 of the lower accommodation container 700 and the side portion 820 of the shield case 800, but peripheries of the first holes HL1 of the lower accommodation container 700 and the second holes HL2 of the shield case 800 also may have portions protruding toward the middle chassis 210. In other words, the periphery of the first holes HL1 of the lower accommodation container 700 may protrude toward the middle chassis 210, and the periphery of the second holes HL2 of the shield case 800 may protrude toward the middle chassis 210. Alternately, the first hole HL1 may have a portion configured to extend and protrude from the inner side surface of the sidewall portion 720 of the lower accommodation container 700 toward the outer side surface of the sidewall portion 720 of the lower accommodation container 700, and the second hole HL2 may have a portion configured to extend and protrude from the outer side surface of the side portion 820 of the shield case 800 toward the inner side surface of the side portion 820 of the shield case 800. Accordingly, protruding directions of the peripheries of the first hole HL1 and the second hole HL2 are opposite and may be directions facing each other.

The inner side surface of the sidewall portion 720 of the lower accommodation container 700 and an inner sidewall of the first hole HL1 may be connected to each other. In this case, a portion in which the inner side surface of the sidewall portion 720 of the lower accommodation container 700 and the inner sidewall of the first hole HL1 meet may be formed in a rounded shape (or a round shape). As described above, the outer side surface of the side portion 820 of the shield case 800 and the inner sidewall of the second hole HL2 may be connected to each other. In this case, a portion in which the outer side surface of the side portion 820 of the shield case 800 and the inner sidewall of the second hole HL2 meet may be formed in a rounded shape. However, the present disclosure is not limited to the above, and the portions in which the inner side surface of the sidewall portion 720 of the lower accommodation container 700 and the inner sidewall of the first hole HL1 meet and the portion in which the outer side surface of the side portion 820 of the shield case 800 and the inner sidewall of second hole HL2 meet may have an angular shape instead of the rounded shape.

An outer periphery of a portion configured to protrude from each of the first hole HL1 and the second hole HL2 according to the embodiment toward the middle chassis 210 may be substantially equal to or smaller than a diameter of the alignment hole AH of the middle chassis 210. Further, a length by which the periphery of the first hole HL1 extends in the second direction DR2 by protruding to the outside from the lower accommodation container 700 and a length by which the periphery of the second hole HL2 extends in the second direction DR2 by protruding to the inside from the shield case 800 may be smaller than an extending length of the alignment hole AH in the second direction DR2. Further, the sum of the length by which the periphery of the first hole HL1 extends in the second direction DR2 by protruding to the outside from the lower accommodation container 700 and the length by which the periphery of the second hole HL2 extends in the second direction DR2 by protruding to the inside from the shield case 800 may be smaller than or equal to the extending length of the alignment hole AH in the second direction DR2 (a thickness of the chassis side surface portion 213 of the middle chassis 210). Accordingly, both the periphery of the first hole HL1 configured to protrude from the sidewall portion 720 of the lower accommodation container 700 and the periphery of the second hole HL2 configured to protrude from the sidewall of the shield case 800 may be inserted into the alignment hole AH together. In this case, the fastener SR (for example, a bolt) may be inserted through the second hole HL2, the alignment hole AH, and the first hole HL1 to fix the shield case 800, the middle chassis 210 and the lower accommodation container 700. Further, as described above, because the middle chassis 210 may be coupled to the middle mold 220 and may configure the middle accommodation container 200, the middle accommodation container 200, the lower accommodation container 700, and the shield case 800 may be appropriately aligned and fixed each other.

Referring to FIG. 3 further, the fastener SR configured to couple the middle accommodation container 200, the lower accommodation container 700, and the shield case 800 may be located on the side surface of the display device 10 at the first long side LS1. In this case, because the fastener SR and an area including the fastener SR do not overlap the display device 10 in the thickness direction of the display device 10, a thickness of each of the fastener SR and the area including the fastener SR may not increase a thickness of the display device 10, and accordingly, the display device 10 may become slim.

Figure 11:
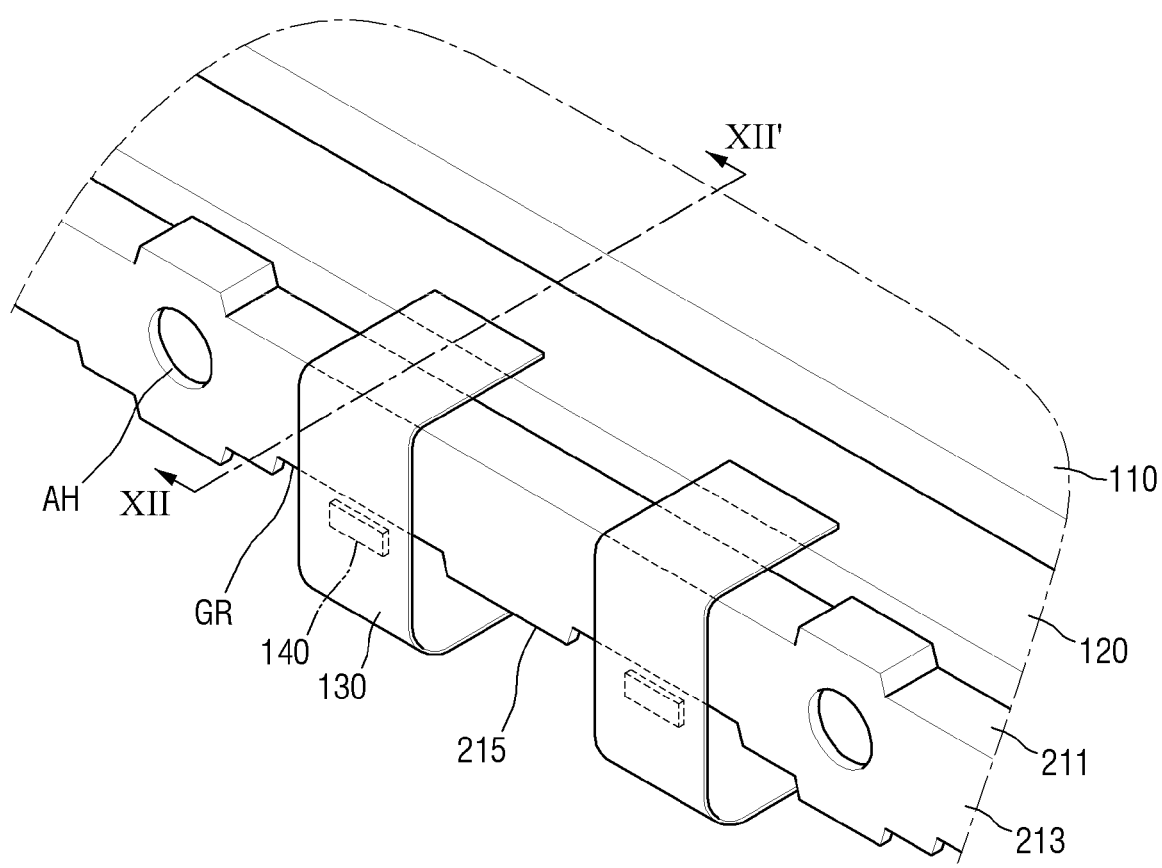
FIG. 11 is a perspective view illustrating a state in which a connection film passes through a groove of the middle chassis.

FIG. 11 is a perspective view illustrating a state in which the connection film passes through the groove of the middle chassis. FIG. 11 is a view for describing that the driving chip 140 located on the connection film 130 may be disposed in the lower end groove GR of the middle chassis 210 when the connection film 130 is bent.

Referring to FIG. 11, as described above, because one end of the connection film 130 is coupled to the first substrate 120, and the other end of the connection film 130 is coupled to the circuit board 150, the connection film 130 may connect the first substrate 120 and the circuit board 150. Further, the first substrate 120 and the circuit board 150 may be coupled to the same surface of the connection film 130. In this case, the driving chip 140 may also be disposed on the one surface of the connection film 130 to which the first substrate 120 and the circuit board 150 are coupled. However, unlike a state in which the first substrate 120 and the circuit board 150 are respectively coupled to the one end and the other end of the connection film 130, the driving chip 140 may be disposed on the connection film 130 to be spaced apart from each of both the first substrate 120 and the circuit board 150 at a predetermined interval. The first substrate 120 and the circuit board 150 according to the embodiment may be coupled to a lower surface of the connection film 130, and the driving chip 140 may also be disposed on the lower surface of the connection film 130.

After the display panel 100 and the backlight unit BLU are coupled to each other, the connection film 130 located at the first long side LS1 may be bent toward a lower portion of the lower accommodation container 700, and the circuit board 150 may be disposed under the lower accommodation container 700. Because the connection film 130 is bent, the driving chip 140 disposed under the connection film 130 may face the chassis side surface portion 213 of the middle chassis 210 and the sidewall portion 720 of the lower accommodation container 700 at the first long side LS1. In this case, the driving chip 140 may be disposed in an area corresponding to the lower end groove GR of the middle chassis 210. In this case, the driving chip 140 located on the connection film 130 may be located between the connection film 130 and the sidewall portion 720 of the lower accommodation container 700 at the first long side LS1 while being located on the connection film 130 and may be located to be spaced apart from a lower portion of the middle chassis 210 at a predetermined interval. Further, when the driving chip 140 is located to be spaced apart from the sidewall portion 720 of the lower accommodation container 700 at the first long side LS1 and the middle chassis 210 at predetermined intervals, contact between the driving chip 140 and the sidewall portion 720 of the lower accommodation container 700 at the first long side LS1 and between the driving chip 140 and the middle chassis 210 may be prevented, and the display device 10 may operate as intended.

Hereinafter, other embodiments of the display device 10 will be described. In the following embodiments, descriptions of configurations the same as those in the above-described embodiment will be omitted or simplified, and differences will be mainly described.

Figure 12:
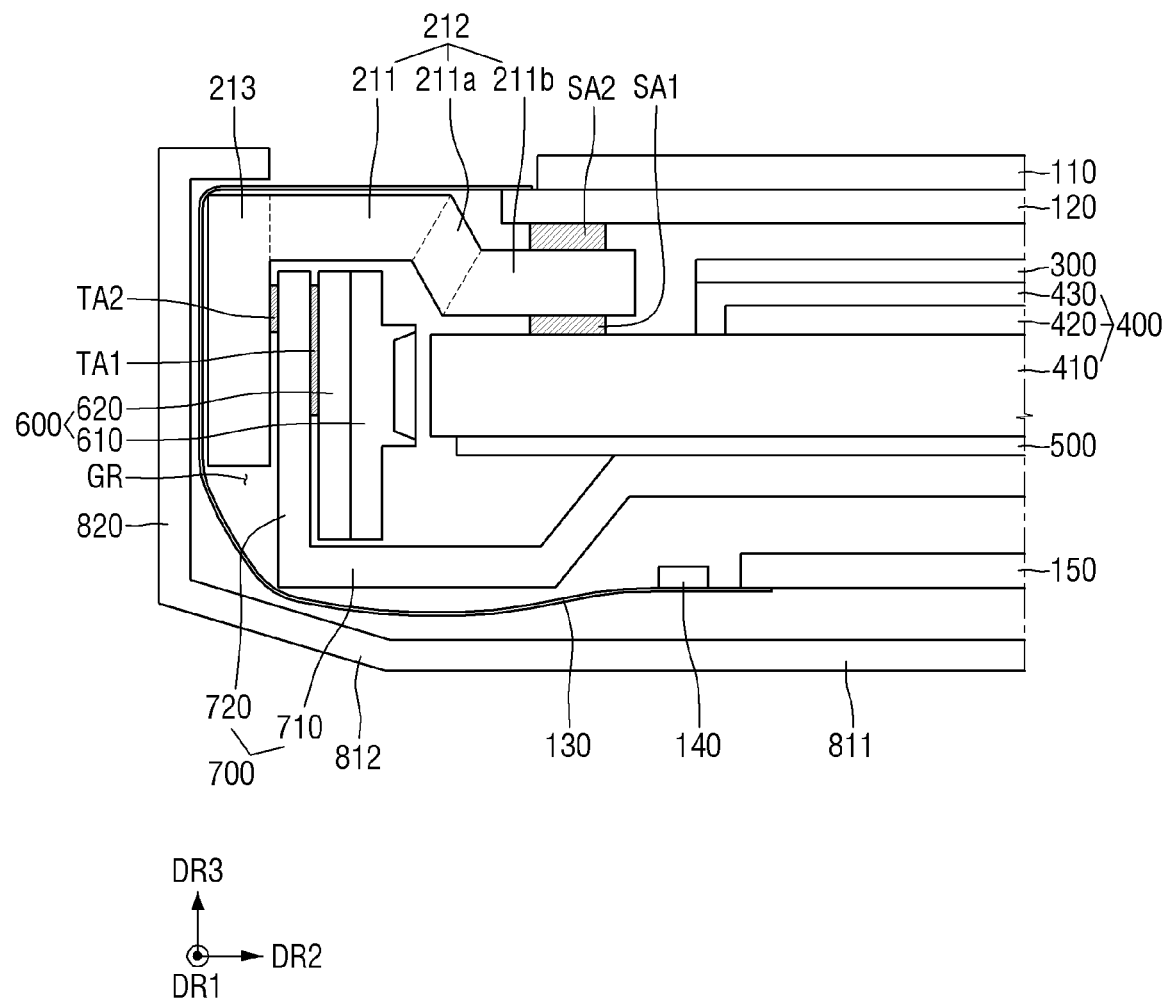
FIG. 12 is a cross-sectional view of a first long side of a display device according to another embodiment.

FIG. 12 is a cross-sectional view of a first long side of a display device according to another embodiment. The embodiment in FIG. 12 exemplifies that the driving chip 140 may be disposed in various locations.

Referring to FIG. 12, the driving chip 140 may be disposed not to face the side surface of the lower accommodation container 700 at the first long side LS1 but may be disposed under the lower accommodation container 700. That is, the driving chip 140 may be disposed on the connection film 130 to which the first substrate 120 and the circuit board 150 are coupled, and because the connection film 130 between the driving chip 140 and one end connected to the first substrate 120 has enough length to reach the driving chip 140 to the lower surface of the lower accommodation container 700, the driving chip 140 may not be located on the side surface of the lower accommodation container 700. For example, as shown in FIG. 12, the driving chip 140 may be disposed between the first substrate 120 and the circuit board 150 on the connection film 130 but may be disposed more adjacent to the circuit board 150 than the first substrate 120. Because the connection film 130 is bent and thus the circuit board 150 may be disposed on the lower surface of the lower accommodation container 700, and the driving chip 140 is disposed on the connection film 130 adjacent to the circuit board 150, the driving chip 140 may be disposed under the lower accommodation container 700 like the circuit board 150. In this case, the bent portion of the connection film 130 may be located more adjacent to the sidewall portion 720 of the lower accommodation container 700 and the lower end portion 811. Accordingly, the connection film 130 and the shield case 800 configured to surround other elements may also be formed to each have a smaller thickness in the third direction DR3 at the first long side LS1, and because a thickness of the display device 10 according to another embodiment at the first long side LS1 may decrease, the display device 10 may become slimmer.

Figure 13:
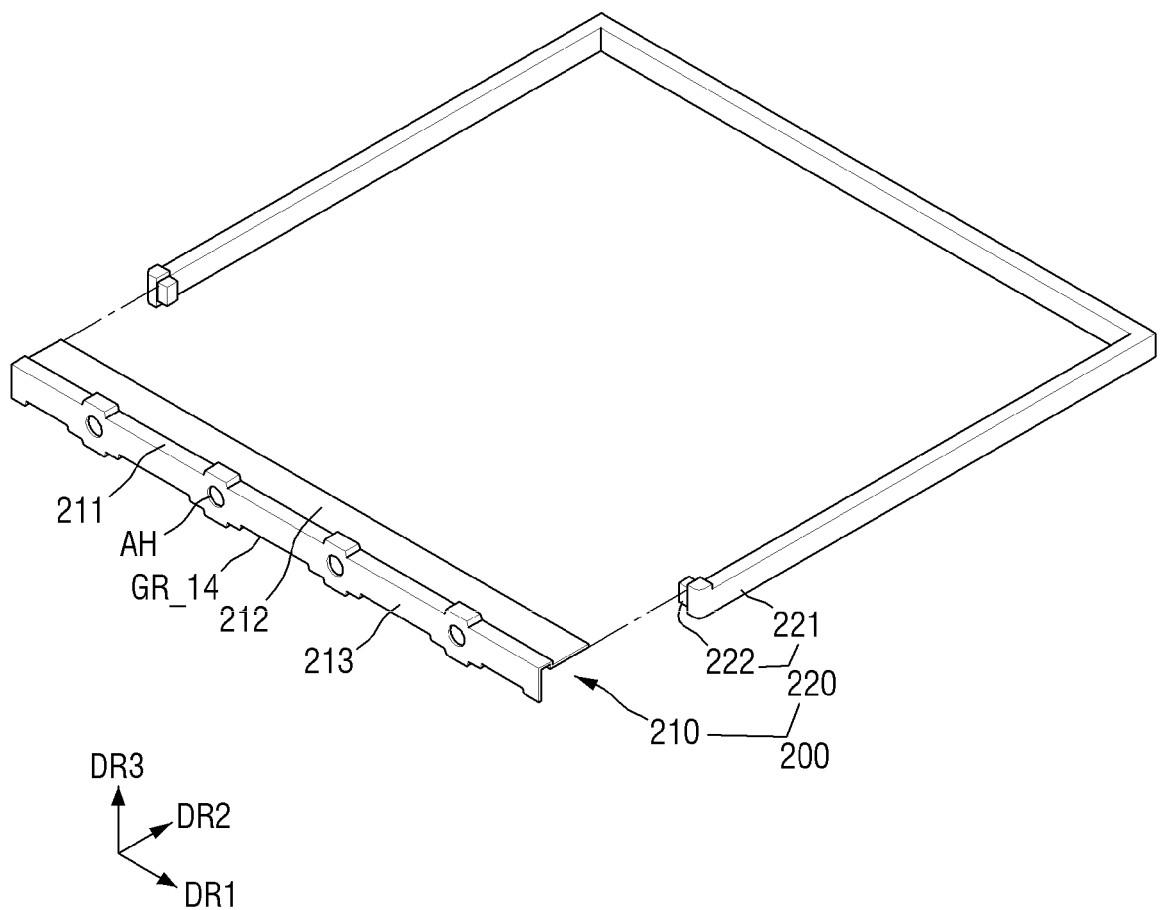
FIG. 13 is an exploded perspective view of a middle accommodation container according to another embodiment.
Figure 14:
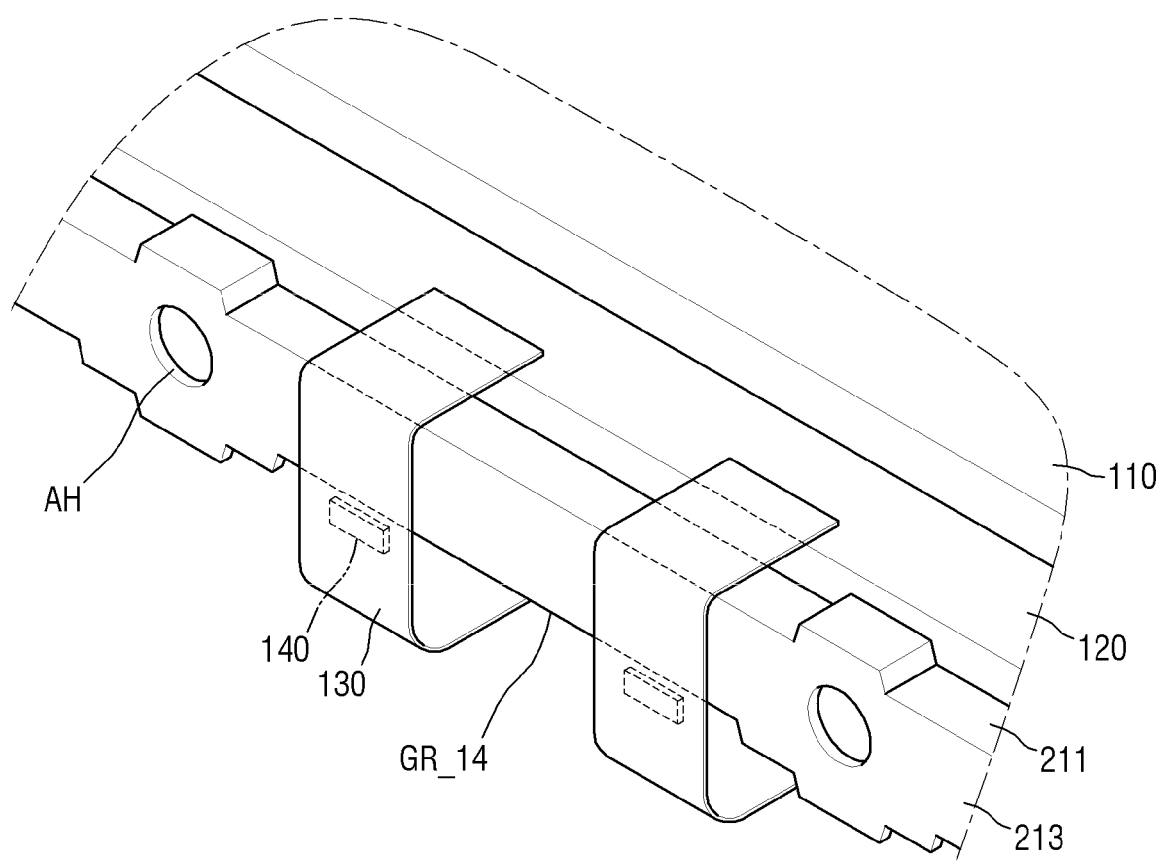
FIG. 14 is a perspective view illustrating a state in which a connection film passes through a groove of the middle chassis according to another embodiment.

FIG. 13 is an exploded perspective view of a middle accommodation container according to another embodiment. FIG. 14 is a perspective view illustrating a state in which a connection film passes through a groove of the middle chassis according to another embodiment. The embodiment in FIGS. 13 and 14 exemplifies that a plurality of (for example, two) driving chips 140 may be disposed in one lower end groove GR_14.

Referring to FIGS. 13 and 14, the second protruding part is not formed between adjacent first protruding parts 214 located at the chassis side surface portion 213 of the middle chassis 210, and a space between the adjacent first protruding parts 214 may be defined as the lower end groove GR_14. That is, the first protruding parts 214 may be formed under the alignment holes AH located in the chassis side surface portion 213 of the middle chassis 210, and the second protruding part may not be formed between the adjacent first protruding parts 214. For example, as shown in FIGS. 13 and 14, in the chassis side surface portion 213 of the middle chassis 210, the first protruding parts 214 and the second protruding parts 215 located at only both ends in an extending direction of the middle chassis 210 are formed, and the lower end grooves GR_14 may be defined between the adjacent first protruding parts 214 or between the first protruding parts 214 and the second protruding parts 215 located at both ends of the middle chassis 210. However, because the description of the lower end grooves GR defined between the adjacent first protruding parts 214, and the first protruding part 214 and the second protruding parts 215 located at both ends of the middle chassis 210 has already been described, descriptions thereof will be omitted.

Referring to FIGS. 13 and 14, the lower end groove GR_14 defined as the space between the adjacent first protruding parts 214 may have a length in the first direction DR1 greater than that of the lower end groove GR defined as a space between the first protruding part 214 and the second protruding part 215 according to one embodiment. Accordingly, two connection films 130 may be disposed on the lower end groove GR_14 defined as the space between the adjacent first protruding parts 214, and accordingly, two driving chips 140 located on each of the two connection films 130 may be disposed in the lower end groove GR_14 defined as the space between the adjacent first protruding parts 214. Since the driving chip 140 is located in the lower end groove GR_14 of the middle chassis 210 and is disposed to be spaced apart from the middle chassis 210 and the lower accommodation container 700 at predetermined intervals, contact between the driving chip 140 and other configurations may be prevented, and thus the display device 10 may operate as intended.

Figure 15:
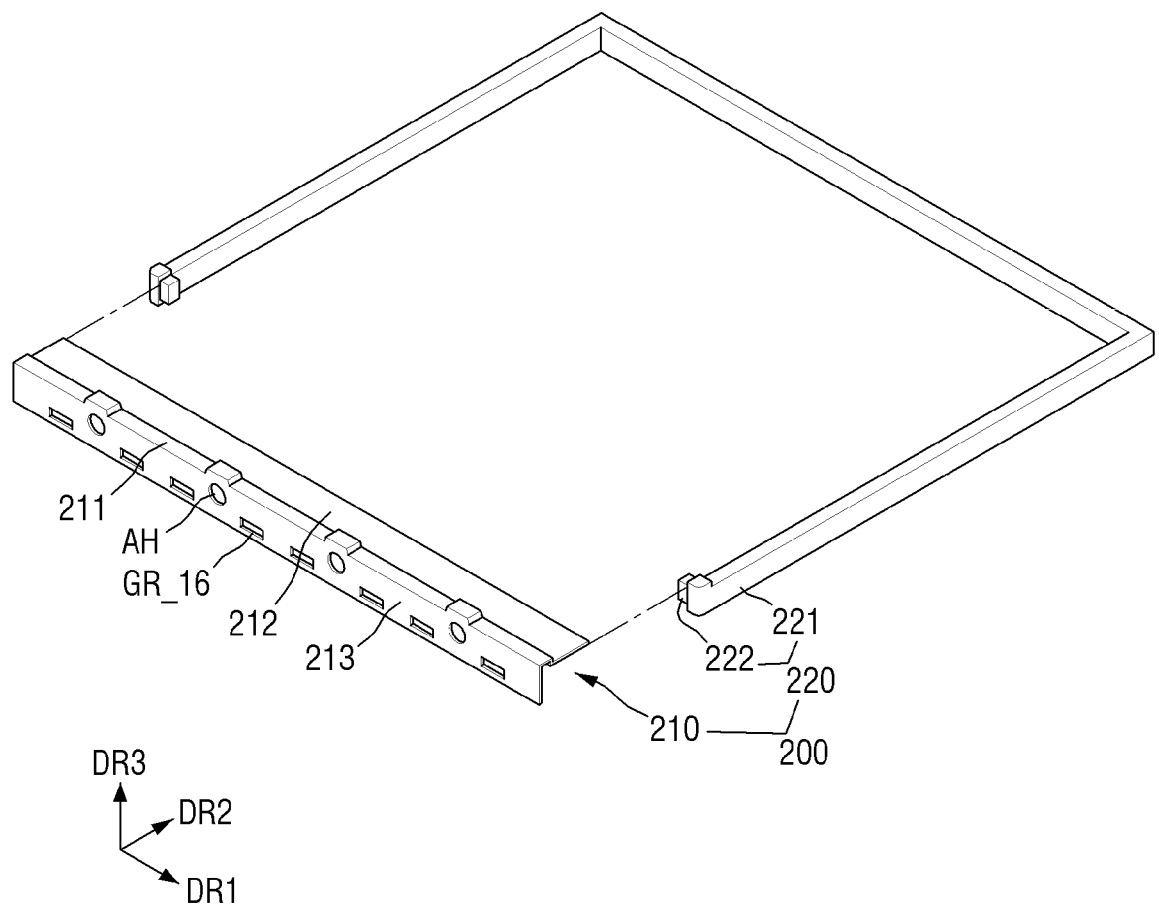
FIG. 15 is an exploded perspective view of a middle accommodation container according to still another embodiment.
Figure 16:
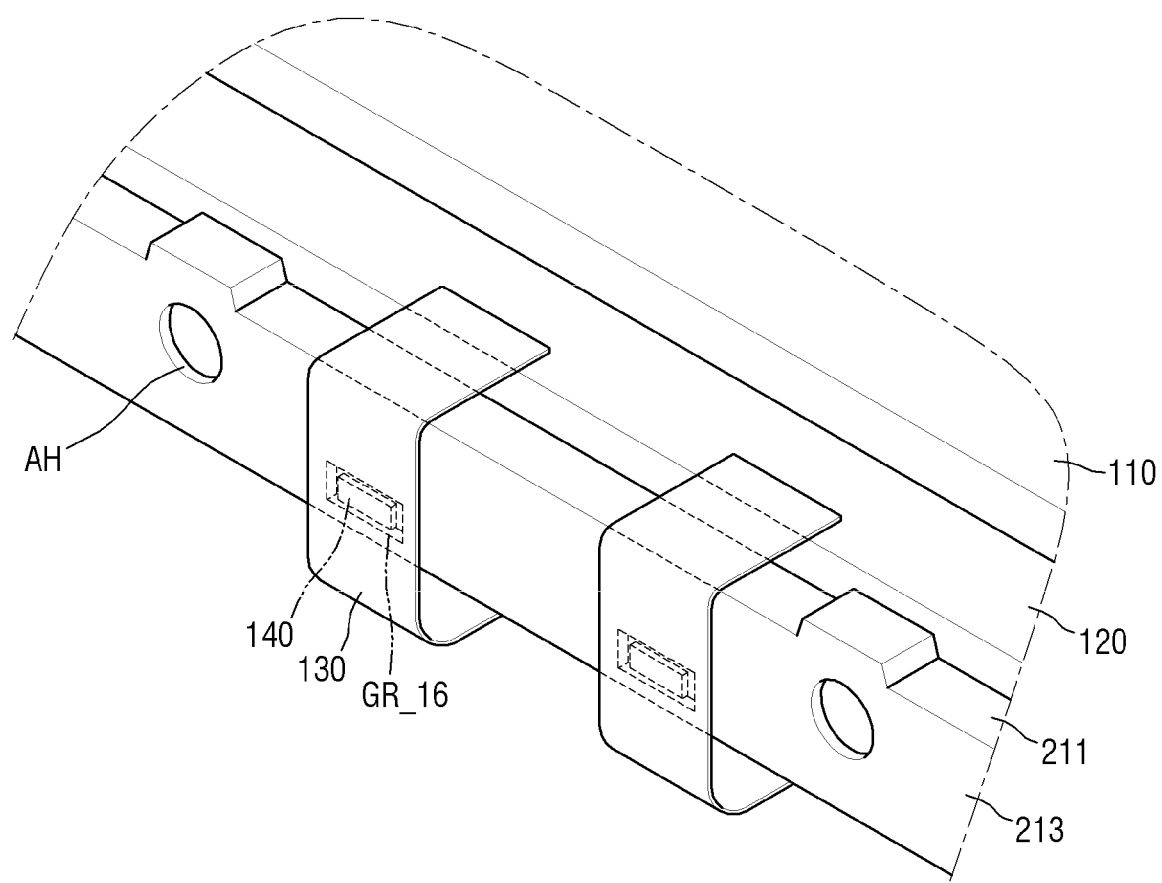
FIG. 16 is a perspective view illustrating a state in which a connection film passes through a groove of a middle chassis according to still another embodiment.

FIG. 15 is an exploded perspective view of a middle accommodation container according to still another embodiment. FIG. 16 is a perspective view illustrating a state in which a connection film passes through a groove of the middle chassis according to still another embodiment. The embodiment in FIGS. 15 and 16 exemplifies that a shape of a lower end groove GR_16 may be variously changed.

Referring to FIGS. 15 and 16, although the lower end groove GR_16 is located in the chassis side surface portion 213 of the middle chassis 210 according to still another embodiment, the lower end groove GR_16 may be a hole formed through the chassis side surface portion 213 of the middle chassis 210. The lower end groove GR_16 may be surrounded by four sides disposed to surround the hole. That is, the middle chassis 210 according to still another embodiment may not include the first protruding parts 214 and the second protruding parts 215 in a lower portion of the chassis side surface portion 213, and the lower portion of the chassis side surface portion 213 of the middle chassis 210 may evenly extend in the first direction DR1. Accordingly, unlike FIG. 6 and the like, a lower portion of the lower end groove GR_16 located in the chassis side surface portion 213 of the middle chassis 210 according to still another embodiment may be closed. However, as described above, because the lower end groove GR_16 may pass through the chassis side surface portion 213 in the second direction DR2, when the connection film 130 is bent, the driving chip 140 disposed on a printed circuit board may be disposed in the lower end groove GR_16. Accordingly, because the driving chip 140 is disposed in the lower end groove GR_16 of the middle chassis 210 to be spaced apart from the middle chassis 210 and the lower accommodation container 700 at predetermined intervals, contact between the driving chip 140 and other configurations may be prevented, and thus a display device 10 may operate as intended.

In concluding the detailed description, those skilled in the art will appreciate that many variations and modifications can be made to the preferred embodiments without substantially departing from the principles of the present inventive concept. Therefore, the disclosed preferred embodiments of the inventive concept are used in a generic and descriptive sense only and not for purposes of limitation.

What is claimed is:

1. A display device including a first side on which a light source is disposed to face the first side, the display device comprising:
   an optical member including a light guide plate;
   a light source assembly disposed adjacent to the first side of the optical member;
   a lower accommodation container accommodating the light source assembly and the optical member;
   a backlight unit disposed on the lower accommodation container and including a middle accommodation container including a central opening; and
   a display panel disposed on the backlight unit and the middle accommodation container,
   wherein the middle accommodation container includes a middle chassis located at the first side, and a middle mold fastened to the middle chassis and disposed along at least one side of the display device other than the first side, and
   wherein the middle chassis is formed of a material having a greater heat conductivity than the middle mold.

2. The display device of claim 1, wherein the middle chassis includes a side surface portion and an upper cover portion extending from an upper end of the side surface portion toward the display panel.

3. The display device of claim 2, wherein the side surface portion includes at least one lower end groove formed in a lower end thereof.

4. The display device of claim 3, wherein:
   the display panel further includes a connection film connected to a substrate of the display panel; and
   the connection film passes through the lower end groove to overlap the lower end groove in a plan view.

5. The display device of claim 4, wherein:
   the display panel further includes a driving chip mounted on one surface of the connection film; and
   the driving chip is disposed in an area corresponding to the lower end groove.

6. The display device of claim 2, wherein:
   the display panel further includes a connection film connected to a substrate of the display panel and a driving chip mounted on one surface of the connection film;
   the side surface portion further includes a hole passing therethrough in a thickness direction; and
   the driving chip is at least partially inserted into the hole.

7. The display device of claim 2, wherein the upper cover portion includes a first upper surface portion connected to the side surface portion, and a second upper surface portion connected to the first upper surface portion through a step portion, and
   wherein the second upper surface portion has a height smaller than that of the first upper surface portion.

8. The display device of claim 7, wherein the first upper surface portion covers a sidewall portion of the lower accommodation container and an upper surface of the light source module in a plan view.

9. The display device of claim 7, wherein the display panel is disposed on the second upper surface portion to overlap the second upper surface portion in a plan view.

10. The display device of claim 9, wherein the second upper surface portion partially overlaps the optical member and is coupled to the optical member at the overlapping portion by a double-sided tape.

11. The display device of claim 9, wherein the display panel does not overlap the first upper surface portion in a plan view.

12. The display device of claim 1, wherein:
    the lower accommodation container includes a bottom surface and a sidewall portion connected to the bottom surface;
    the middle chassis includes a chassis side surface portion; and
    the chassis side surface portion is disposed at an outer side of the sidewall portion of the lower accommodation container.

13. The display device of claim 12, wherein:
    the middle mold includes a mold side surface portion; and
    the mold side surface portion is disposed at an outer side of the sidewall portion of the lower accommodation container.

14. The display device of claim 12, wherein:
    the sidewall portion of the lower accommodation container includes at least one first hole;
    the chassis side surface portion of the middle chassis includes at least one alignment hole; and
    the lower accommodation container and the middle chassis are coupled to each other by a fastener formed through the first hole and the alignment hole.

15. The display device of claim 1, wherein:
the light guide plate is formed of glass; and
the optical member further includes a wavelength conversion layer disposed on an upper surface of the light guide plate.

16. A backlight unit comprising:
an optical member including a light guide plate, the light guide plate including a first side;
a light source assembly disposed to face the first side of the optical member;
a lower accommodation container configured to accommodate the light source assembly and the optical member; and
a middle accommodation container disposed on the lower accommodation container and including a central opening,
wherein the middle accommodation container includes a middle chassis located at the first side, and a middle mold fastened to the middle chassis and disposed along at least one side of the light guide plate other than the first side, and
the middle chassis is formed of a material having a greater heat conductivity than the middle mold.

17. The backlight unit of claim 16, wherein:
the middle chassis includes a side surface portion and an upper cover portion configured to extend from an upper end of the side surface portion toward the light guide plate; and
the side surface portion includes at least one lower end groove formed in a lower end thereof.

18. The backlight unit of claim 17, wherein the upper cover portion includes a first upper surface portion connected to the side surface portion, and a second upper surface portion connected to the first upper surface portion through a step portion, and
wherein the second upper surface portion has a height smaller than that of the first upper surface portion.

19. The backlight unit of claim 16, wherein:
the lower accommodation container includes a bottom surface and a sidewall portion connected to the bottom surface;
the middle chassis includes a chassis side surface portion;
the middle mold includes a mold side surface portion;
the chassis side surface portion is disposed at an outer side of the sidewall portion of the lower accommodation container; and
the mold side surface portion is disposed at an outer side of the sidewall portion of the lower accommodation container.

20. The backlight unit of claim 16, wherein:
the light guide plate is formed of glass; and
the optical member further includes a wavelength conversion layer disposed on an upper surface of the light guide plate.

* * * * *